US012492593B2

(12) United States Patent
Wang

(10) Patent No.: US 12,492,593 B2
(45) Date of Patent: Dec. 9, 2025

(54) ASSEMBLED DOOR

(71) Applicant: NAN YA PLASTICS CORPORATION, Taipei (TW)

(72) Inventor: Kuei-Yung Wang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 19/239,910

(22) Filed: Jun. 16, 2025

(65) Prior Publication Data

US 2025/0305349 A1 Oct. 2, 2025

(30) Foreign Application Priority Data

May 21, 2025 (TW) ................................ 114205117

(51) Int. Cl.

| | |
|---|---|
| ***E06B 3/54*** | (2006.01) |
| ***B29C 45/00*** | (2006.01) |
| ***E06B 1/30*** | (2006.01) |
| ***E06B 1/60*** | (2006.01) |
| ***E06B 3/62*** | (2006.01) |

(52) U.S. Cl.

CPC ................ *E06B 3/549* (2013.01); *E06B 1/60* (2013.01); *B29C 45/006* (2013.01); *E06B 1/30* (2013.01); *E06B 2003/6217* (2013.01)

(58) Field of Classification Search

CPC ...... E06B 1/60; E06B 2003/6217; E06B 1/30; E06B 3/549; B29C 45/006

See application file for complete search history.

(56) References Cited

U.S. PATENT DOCUMENTS

| | | | | |
|---|---|---|---|---|
| 6,272,801 B1 * | 8/2001 | Suh | E06B 3/685 | 52/211 |
| 7,386,959 B2 * | 6/2008 | Ouellette | E06B 3/5892 | 24/294 |
| 8,813,442 B1 * | 8/2014 | Edwards | E06B 3/549 | 52/204.5 |
| 2003/0056442 A1 * | 3/2003 | Gerard | E06B 3/5892 | 49/504 |
| 2015/0252612 A1 * | 9/2015 | Charlton | E06B 3/5892 | 425/588 |

* cited by examiner

*Primary Examiner* — Omar F Hijaz

(74) *Attorney, Agent, or Firm* — Li & Cai Intellectual Property Office

(57) ABSTRACT

An assembled door includes a door panel, a first outer frame, a second outer frame, multiple first snap-fit components, multiple second snap-fit components, and a decorative component. The first and the second outer frames are fixed on two sides of the door panel. The decorative component is disposed in a door opening of the door panel and is located between the first and the second outer frames. The first snap-fit components are fixed on the first outer frame, the second snap-fit components are fixed on the first snap-fit components, and a part of the first snap-fit components and a part of the second snap-fit components are located in the door opening. The first and the second snap-fit components fixed to each other can cooperate with the first outer frame, so as to jointly retain the decorative component. The second outer frame can interlock with the second snap-fit components.

10 Claims, 19 Drawing Sheets

ASSEMBLED DOOR

CROSS-REFERENCE TO RELATED PATENT APPLICATION

This application claims the benefit of priority to Taiwan Patent Application No. 114205117, filed on May 21, 2025. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an assembled door, and more particularly to an assembled door having a decorative component.

BACKGROUND OF THE DISCLOSURE

A conventional assembled door with glass often involves complicated installation procedures. Moreover, once the conventional assembled door is installed in a building, relevant operators are unable to replace the glass without removing a plurality of hinges of the conventional assembled door, causing inconvenience for the operators.

SUMMARY OF THE DISCLOSURE

In response to the above-referenced technical inadequacies, the present disclosure provides an assembled door for improving upon conventional assembled doors with glass that suffer from complicated installation procedures.

In order to solve the above-mentioned problems, one of the technical aspects adopted by the present disclosure is to provide an assembled door. The assembled door includes a door panel, two outer frames, a plurality of snap-fit components, and a decorative component. The door panel has a door opening, the snap-fit components are disposed in the door opening, and the two outer frames are fixed on two sides of the door panel via the snap-fit components. The decorative component is fixed in the door opening by one of the two outer frames together with the snap-fit components.

In order to solve the above-mentioned problems, another one of the technical aspects adopted by the present disclosure is to provide an assembled door. The assembled door includes a door panel, a first outer frame, a second outer frame, a plurality of first snap-fit components, a plurality of second snap-fit components, and a decorative component. The door panel has a door opening. The door opening penetrates through the door panel. The first outer frame is fixedly disposed on one of two sides of the door panel. The first outer frame is configured to partially cover a part of the door opening. The first outer frame includes a plurality of first outer frame engaging structures and a plurality of second outer frame engaging structures. The second outer frame is fixedly disposed on another one of the two sides of the door panel. The second outer frame is configured to partially cover a part of the door opening. The second outer frame includes a plurality of third outer frame engaging structures. Each of the first snap-fit components includes at least one first engaging structure and at least one first interconnecting structure. The at least one first engaging structure is located on one of two sides of the first snap-fit component. The first engaging structure interlocks with the first outer frame engaging structure, so that the first snap-fit component is fixed on the first outer frame. The at least one first interconnecting structure is located on another one of the two sides of the first snap-fit component. Each of the second snap-fit components includes a plurality of second engaging structures, at least one second interconnecting structure, and at least one third engaging structure. The second engaging structures are respectively connected to the second outer frame engaging structures of the first outer frame. Each of the second snap-fit components is fixed on one side of the first outer frame through the second engaging structures. The at least one second interconnecting structure is located on one of two sides of the second snap-fit component. The second interconnecting structure interlocks with the first interconnecting structure, so that the second snap-fit component is fixed on one of the two sides of the first snap-fit component. The at least one third engaging structure is located on another one of the two sides of the second snap-fit component. The third engaging structure interlocks with the third outer frame engaging structure of the second outer frame, so that the second snap-fit component is fixed on the second outer frame. The decorative component is located in the door opening and is jointly fixed on the door panel by the first outer frame, the second outer frame, the first snap-fit components, and the second snap-fit components. The first outer frame and the first snap-fit components fixed on the door panel are configured to jointly support the decorative component, and the second snap-fit components interlocking with the first snap-fit components are configured to jointly retain the decorative component by the first outer frame and the first snap-fit components.

Therefore, in the assembled door provided by the present disclosure, by virtue of the first outer frame, the first snap-fit component, the second snap-fit component, and the second outer frame, the assembled door can enable operators to quickly and easily complete the installation of the decorative component of the assembled door. Moreover, in the assembled door provided by the present disclosure, by virtue of "a decorative component being jointly fixed on the door panel by the first outer frame, the second outer frame, the first snap-fit components, and the second snap-fit components," the assembled door can allow operators to directly replace the decorative component without removing the hinges, even when the assembled door is already installed in the building.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
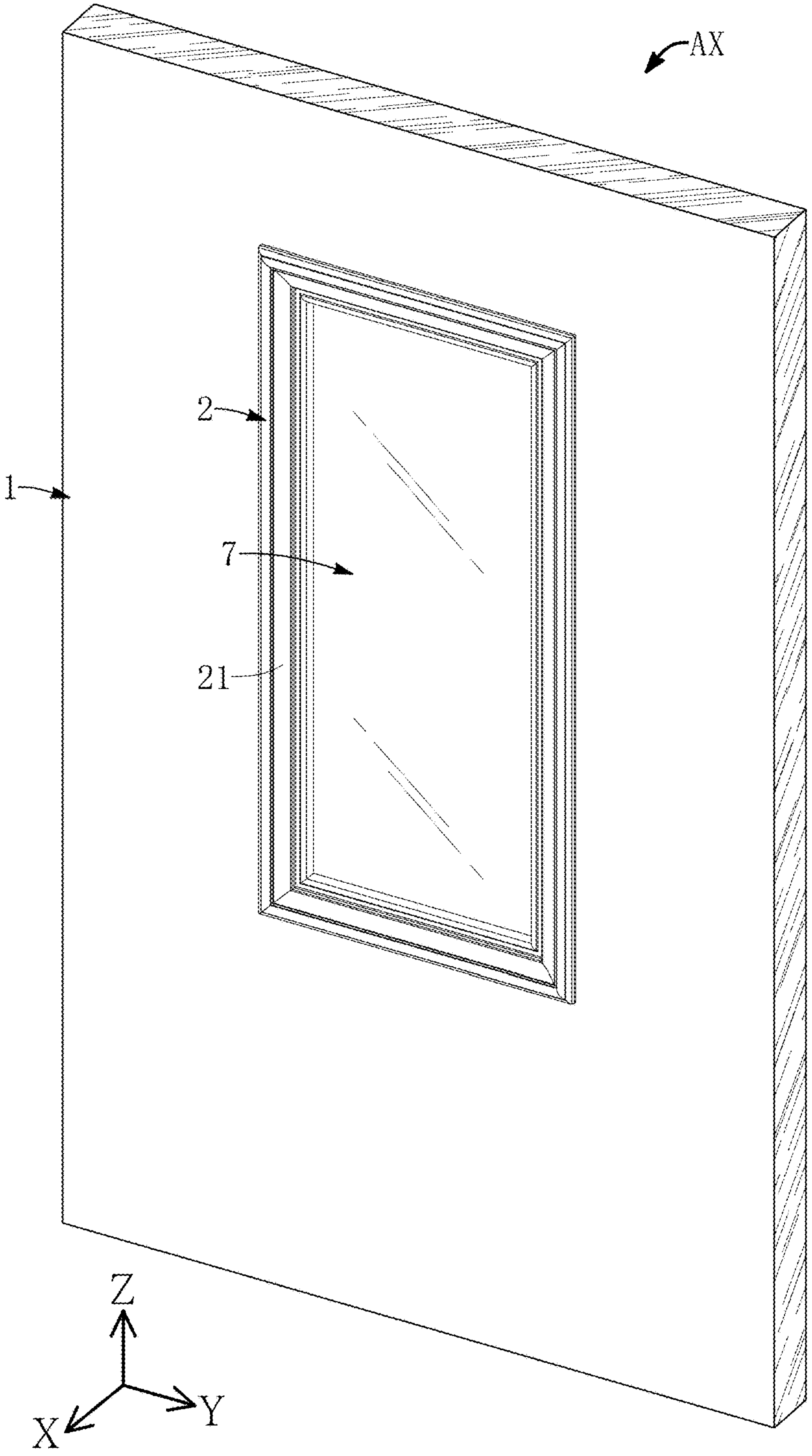
FIG. 1 and FIG. 2 are schematic views of an assembled door from different perspectives according to one of the embodiments of the present disclosure.
Figure 2:
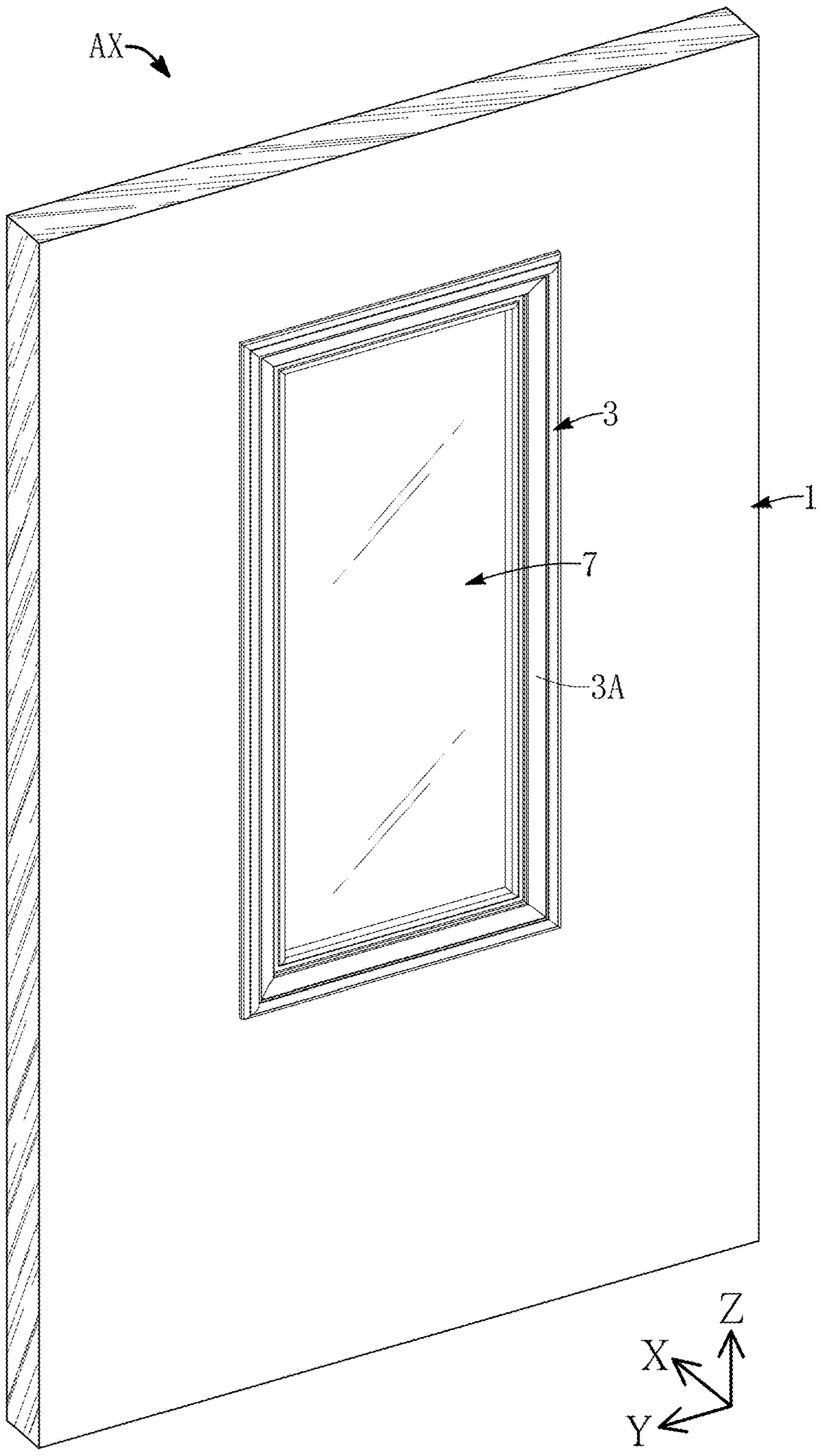

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 3:
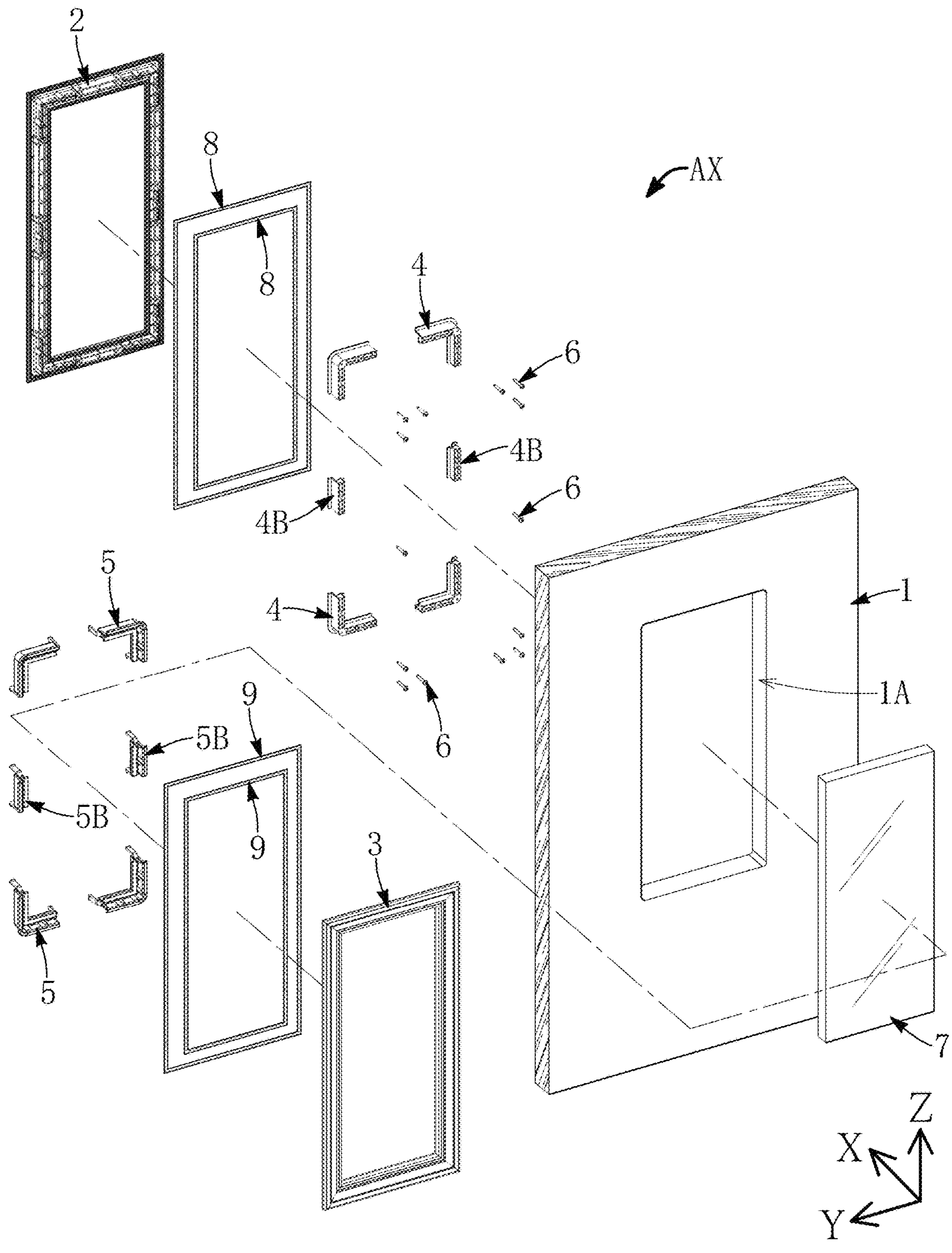
FIG. 3 is a schematic partial exploded view of the assembled door according to one of the embodiments of the present disclosure.
Figure 4:
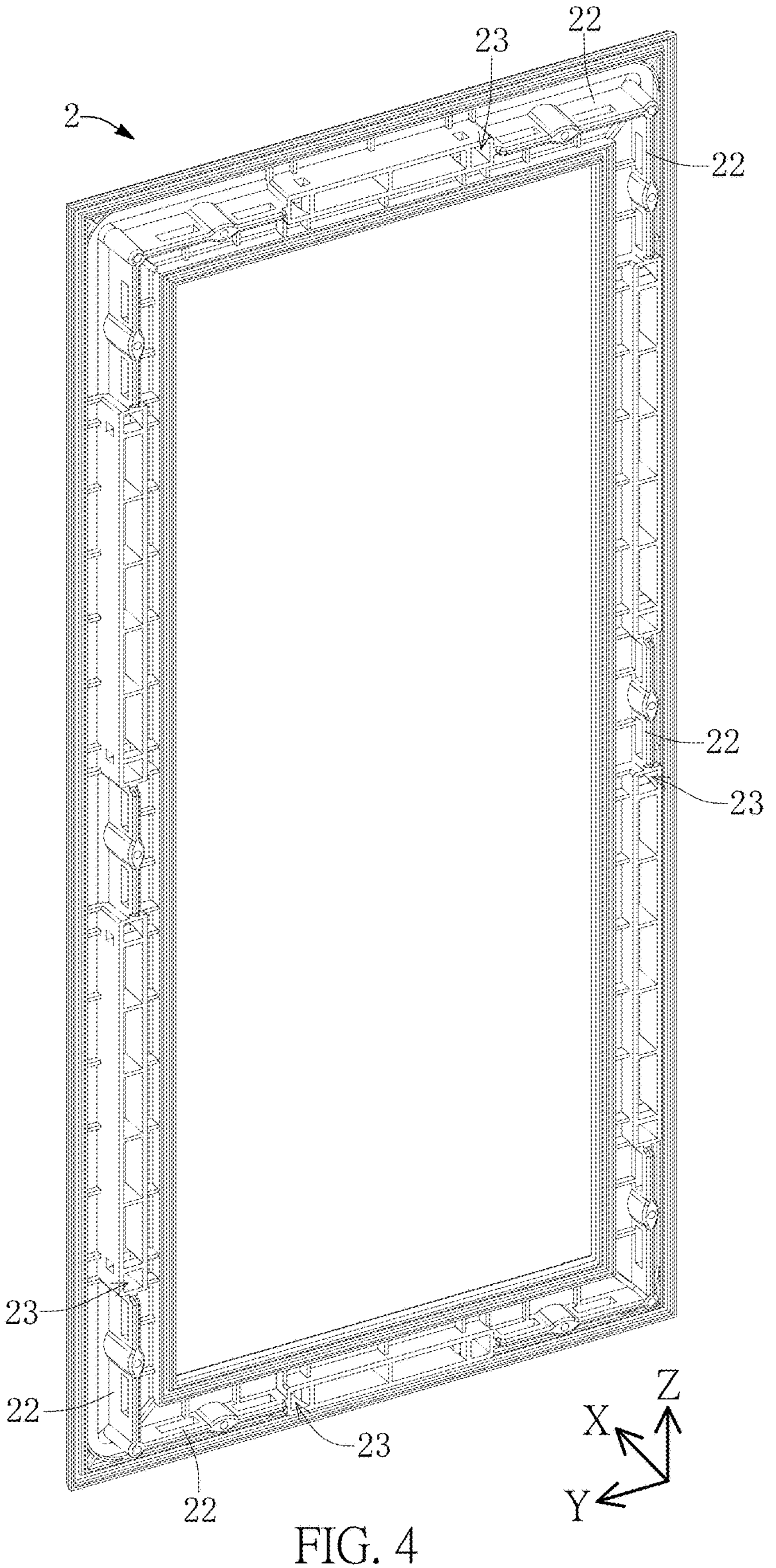
FIG. 4 is a schematic view of a first outer frame of the assembled door according to one of the embodiments of the present disclosure.
Figure 5:
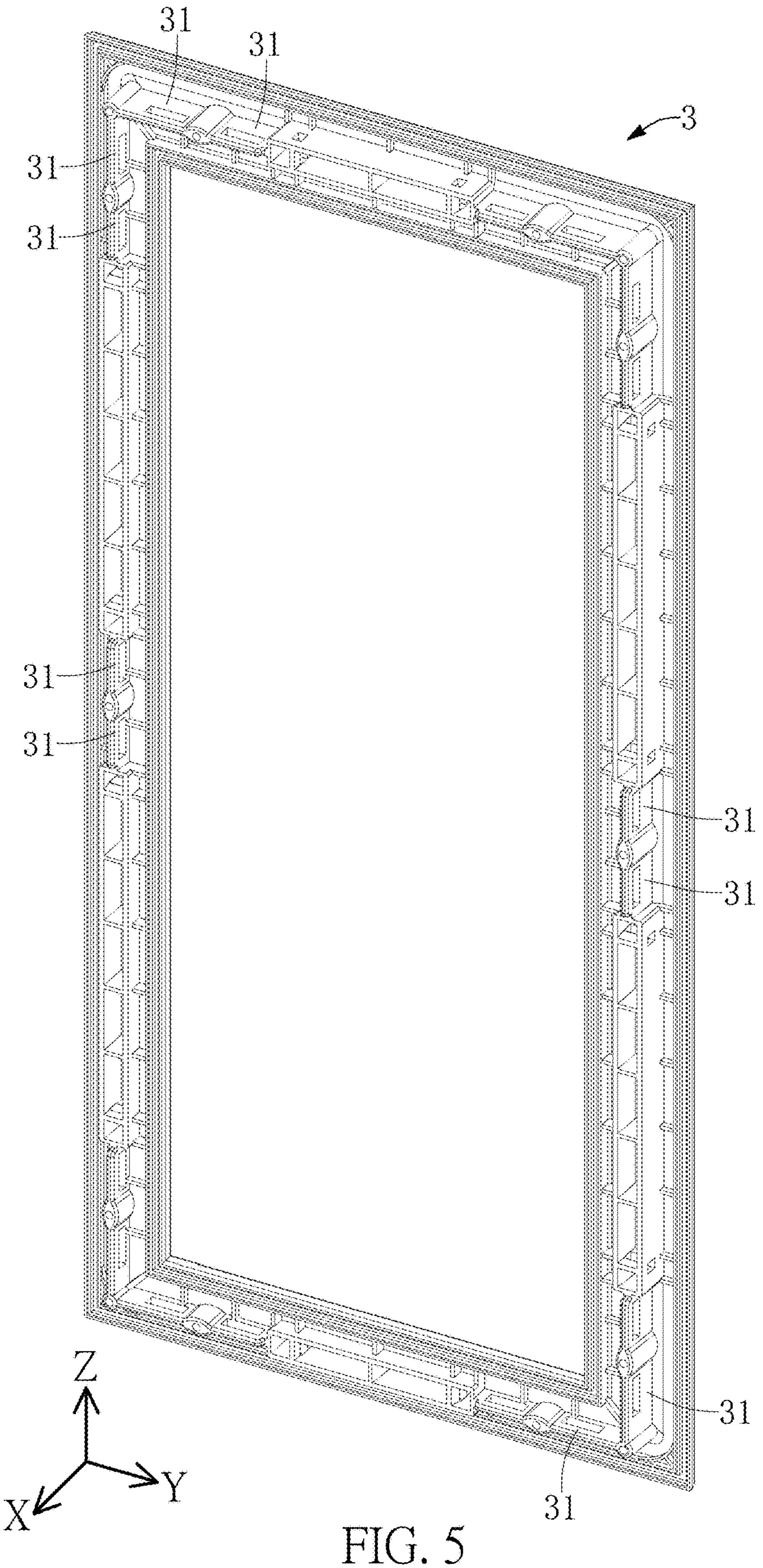
FIG. 5 is a schematic view of a second outer frame of the assembled door according to one of the embodiments of the present disclosure.

Referring to FIG. 1 to FIG. 5, FIG. 1 and FIG. 2 are schematic views of an assembled door from different perspectives according to one of the embodiments of the present disclosure, FIG. 3 is a schematic partial exploded view of the assembled door according to one of the embodiments of the present disclosure, FIG. 4 is a schematic view of a first outer frame of the assembled door according to one of the embodiments of the present disclosure, and FIG. 5 is a schematic view of a second outer frame of the assembled door according to one of the embodiments of the present disclosure.

The assembled door AX of the present disclosure includes a door panel 1, two outer frames, a plurality of snap-fit components, and a decorative component 7. The door panel 1 has a door opening 1A, and the snap-fit components are arranged in the door opening 1A. The two outer frames are fixed on two sides of the door panel 1 via the snap-fit components, and the decorative component 7 is fixed in the door opening by one of the two outer frames together with the snap-fit components.

More specifically, the two outer frames are respectively defined as a first outer frame 2 and a second outer frame 3. The snap-fit components are respectively defined as a plurality of first snap-fit components 4 and a plurality of second snap-fit components 5. The assembled door AX further includes a plurality of locking components 6. The door opening 1A penetrates through the door panel 1. The door panel 1 may, for example, be made of plastic, but the material of the door panel 1 is not limited herein. In another one of the embodiments, the door panel 1 may also be made of wood or metal.

The position, size, and shape of the door opening 1A can be designed according to actual requirements and are not limited to those shown in the figures. In one of the embodiments, the shape of the door opening 1A may also be approximately square, oval, circular, or the like. A quantity of the door openings 1A included in the door panel 1 is not limited to a single opening.

The first outer frame 2, the second outer frame 3, the first snap-fit components 4, the second snap-fit components 5, and the locking components 6 are used to cooperate with each other, so that the decorative component 7 is fixed on the door opening 1A of the door panel 1. For example, the decorative component 7 may be transparent glass, frosted glass, or the like. Alternatively, the decorative component 7 may be a plastic panel.

Figure 6:
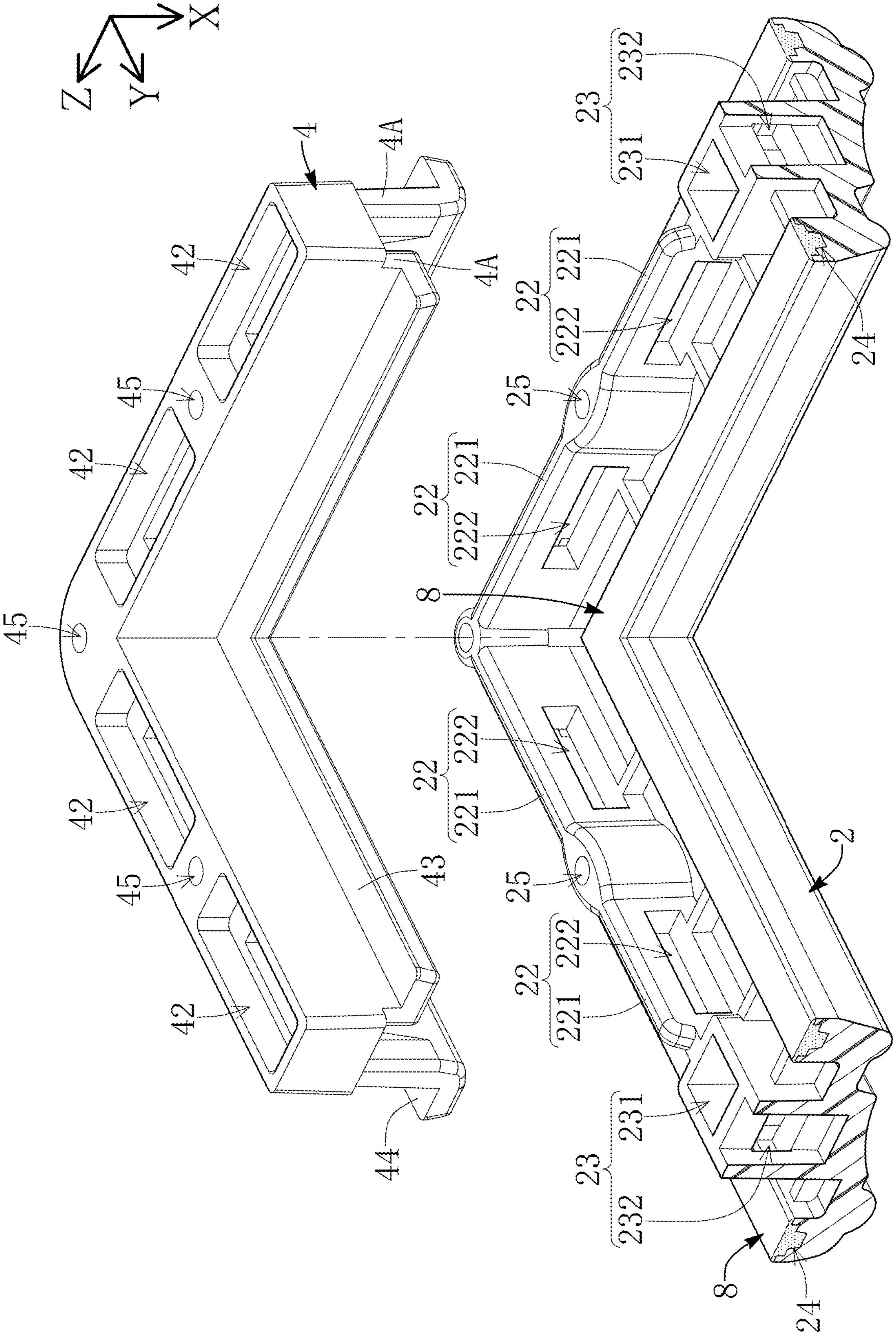
FIG. 6 is a schematic cross-sectional view of the first outer frame and a first snap-fit component of the assembled door according to one of the embodiments of the present disclosure.
Figure 7:
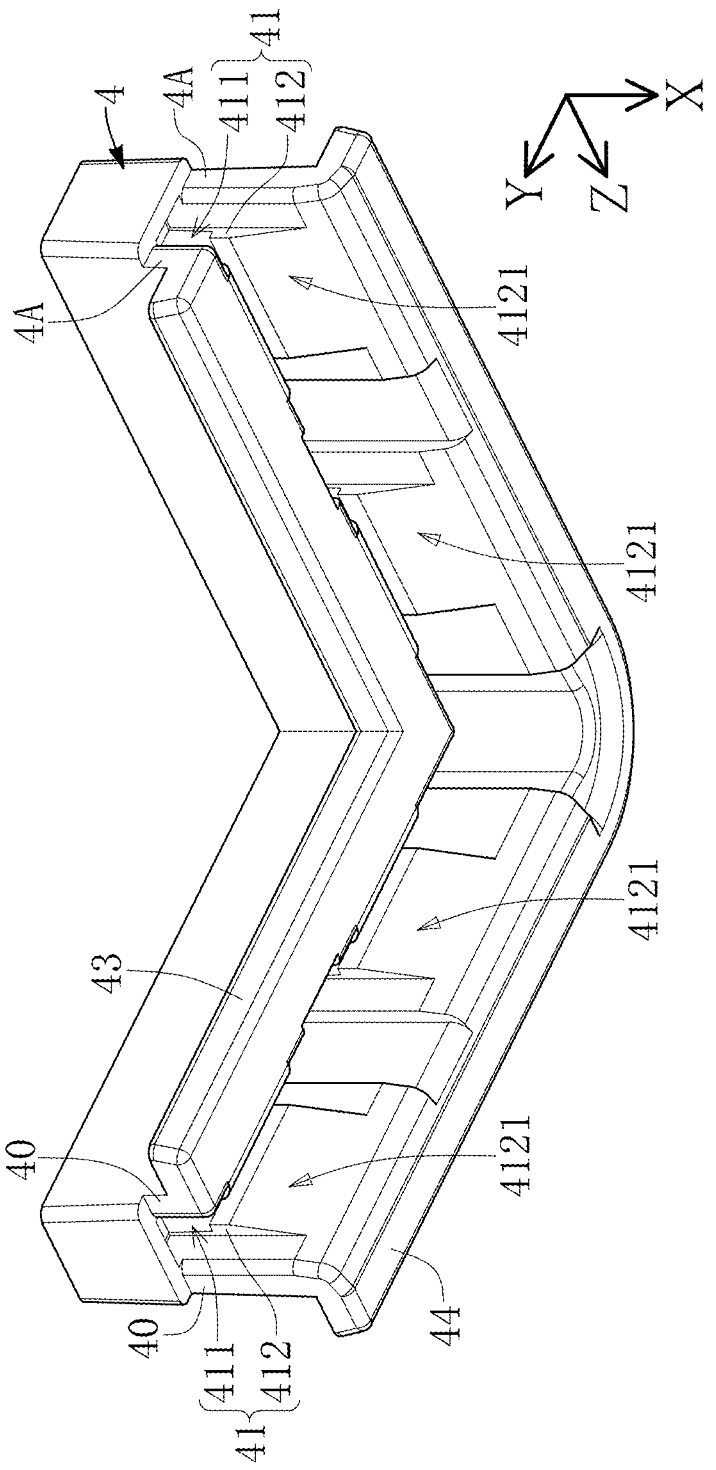
FIG. 7 is a schematic view of the first snap-fit component of the assembled door according to one of the embodiments of the present disclosure.
Figure 8:
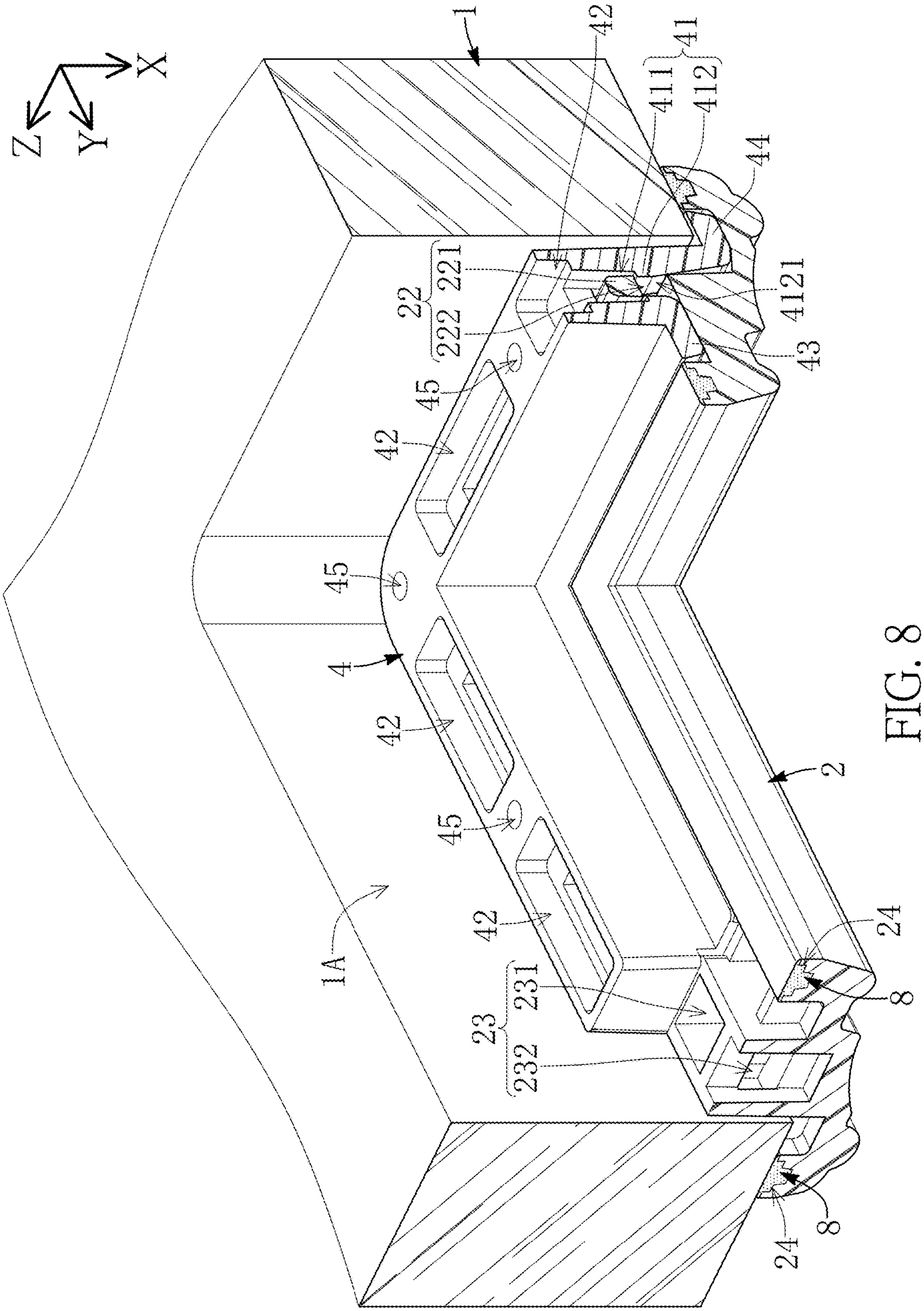
FIG. 8 is a schematic partial cross-sectional view of the first snap-fit component of the assembled door installed on the first outer frame that is installed in a door opening according to one of the embodiments of the present disclosure.

Referring to FIG. 3 to FIG. 8, FIG. 3 is a schematic partial exploded view of the assembled door according to one of the embodiments of the present disclosure, FIG. 4 is a schematic view of a first outer frame of the assembled door according to one of the embodiments of the present disclosure, FIG. 5 is a schematic view of a second outer frame of the assembled door according to one of the embodiments of the present disclosure, FIG. 6 is a schematic cross-sectional view of the first outer frame and a first snap-fit component of the assembled door according to one of the embodiments of the present disclosure, FIG. 7 is a schematic view of the first snap-fit component of the assembled door according to one of the embodiments of the present disclosure, and FIG. 8 is a schematic partial cross-sectional view of the first snap-fit component of the assembled door installed on the first outer frame that is installed in a door opening according to one of the embodiments of the present disclosure.

The first outer frame 2 is fixedly disposed on one of two sides of the door panel 1, and the first outer frame 2 covers a part of the door opening 1A. One of two sides of the first outer frame 2 has a decorative structure 21. When the first outer frame 2 is fixed on the one of the two sides of the door panel 1, the decorative structure 21 is exposed on the one of the two sides of the door panel 1.

Another one of the two sides of the first outer frame 2 has a plurality of first outer frame engaging structures 22 and a plurality of second outer frame engaging structures 23. In an example where the door opening 1A is substantially rectangular, a part of the first outer frame engaging structures 22 and a part of the second outer frame engaging structures 23 are disposed at the four corner positions of the first outer frame 2. A part of the first outer frame engaging structures 22 and a part of the second outer frame engaging structures 23 may be disposed on a long side of the first outer frame 2, and another part of the first outer frame engaging structures 22 and another part of the second outer frame engaging structures 23 may be disposed on a short side of the first outer frame 2. The positions and quantities of the first outer frame engaging structures 22 and the second outer frame engaging structures 23 can be designed according to a length and a width of the door opening 1A, and are not limited to those shown in the figures.

Figure 13:
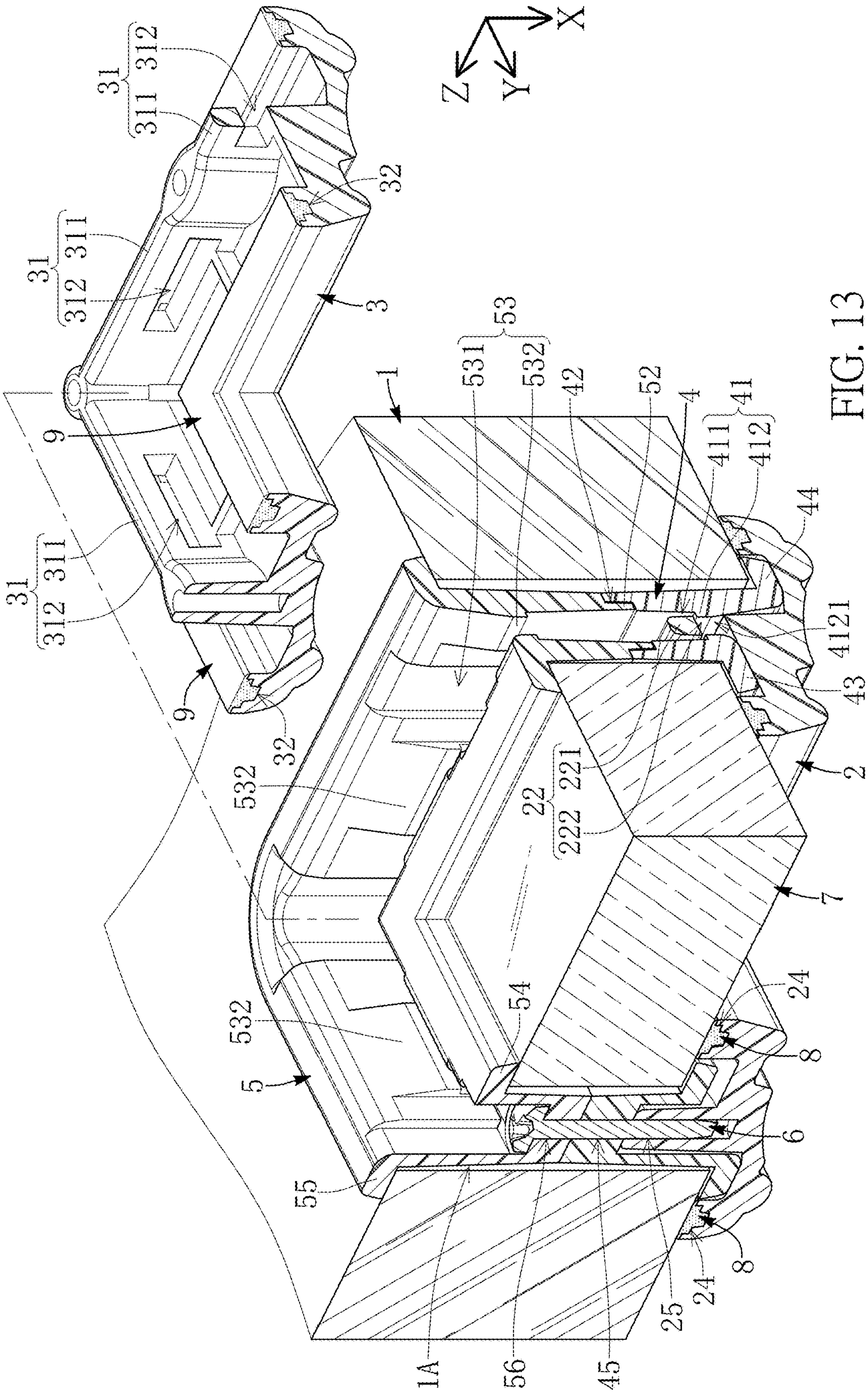
FIG. 13 is a schematic exploded and cross-sectional view of the second outer frame of the assembled door, and the first outer frame, the first snap-fit component and the second snap-fit component that are installed on the first outer frame of the door panel according to one of the embodiments of the present disclosure.

The second outer frame 3 is fixedly disposed on another one of the two sides of the door panel 1 and covers a part of the door opening 1A. The second outer frame 3 includes a plurality of third outer frame engaging structures 31 (as shown in FIG. 13). In the present embodiment, the first outer frame 2 and the second outer frame 3 have completely identical structures. That is to say, the shapes and positions of the first outer frame engaging structures 22 of the first outer frame 2 are identical to the shapes and positions of the third outer frame engaging structures 31 of the second outer frame 3. In other words, the first outer frame 2 and the second outer frame 3 can be produced using the same mold, so as to save production costs. Naturally, in other embodiments of the present disclosure, the first outer frame 2 and the second outer frame 3 may be components that are not completely identical. A part of the third outer frame engaging structures 31 are disposed at four corner positions of the second outer frame 3, another part of the third outer frame engaging structures 31 may be disposed along the long side of the second outer frame 3, and still another part of the third outer frame engaging structures 31 may be disposed along the short side of the second outer frame 3. The positions and quantities of the third outer frame engaging structures 31 can be designed according to the length and width of the door opening 1A and are not limited to those shown in the figures.

Referring to FIG. 3, FIG. 6 and FIG. 13, in practical applications, the first outer frame 2 may further include two first annular grooves 24, one of the two first annular grooves 24 is disposed adjacent to an outer edge of the first outer frame 2, and another one of the two first annular grooves 24 is disposed adjacent to an inner edge of the first outer frame 2. The second outer frame 3 may further include two second annular grooves 32, one of the two second annular grooves 32 is disposed adjacent to an outer edge of the second outer frame 3, and another one of the two second annular grooves 32 is disposed adjacent to an inner edge of the second outer frame 3.

The assembled door AX may further include two first annular sealing members 8 and two second annular sealing members 9. The two first annular sealing members 8 are fixed in the two first annular grooves 24, and the two second annular sealing members 9 are fixed in the two second annular grooves 32. Each of the two first annular sealing members 8 is disposed between the door panel 1 and the first outer frame 2, and the door opening 1A is surrounded by each of the two first annular sealing members 8. Each of the two second annular sealing members 9 is disposed between the door panel 1 and the second outer frame 3, and the door opening 1A is surrounded by each of the two second annular sealing members 9. The two first annular sealing members 8 primarily seal a gap between the first outer frame 2 and the door panel 1, and the two second annular sealing members 9 primarily seal a gap between the second outer frame 3 and the door panel 1. Thus, external dirt, liquids, and the like are prevented from easily entering the door opening 1A. The quantities of the first annular grooves 24, the second annular grooves 32, the first annular sealing members 8, and the second annular sealing members 9 may be increased or decreased according to actual requirements and are not limited to those shown in the figures.

Referring to FIG. 6 to FIG. 8, each of the first snap-fit components 4 includes at least one first engaging structure 41 and a plurality of first interconnecting structures 42. The at least one first engaging structure 41 is located on one side of one of the first snap-fit components 4. The first snap-fit component 4 is fixed on the first outer frame 2 by interlocking the first engaging structure 41 with the first outer frame engaging structure 22. It should be noted that the first engaging structure 41 and the first outer frame engaging structure 22 are primarily configured to fix the first snap-fit component 4 on the first outer frame 2, and thus the specific shapes of the first engaging structure 41 and the first outer frame engaging structure 22 are not limited herein. In practical applications, the first engaging structure 41 and the first outer frame engaging structure 22 may be designed as structures capable of being repeatedly assembled and disassembled, so as to allow operators to install the first snap-fit component 4 on the first outer frame 2 or remove the first snap-fit component 4 from the first outer frame 2 as needed.

In other embodiments of the present disclosure, the first outer frame engaging structure 22 may include a wall 221 and a plurality of perforations 222. The first engaging structure 41 may include a locking slot 411 and a plurality of hook-shaped structures 412. When the first engaging structure 41 and the first outer frame engaging structure 22 engage with each other, the locking slot 411 engages with the wall 221, and a portion of the hook-shaped structures 412 is located in one of the perforations 222. When the first engaging structure 41 and the first outer frame engaging structure 22 are engaged, if the first snap-fit component 4 is slightly pulled in a direction away from the first outer frame 2, the first snap-fit component 4 will abut against a sidewall forming the perforations 222 due to the hook-shaped structures 412, so as to prevent the first snap-fit component 4 from easily disengaging from the first outer frame 2.

In practical applications, a width of the engaging groove 411 may be slightly smaller than a thickness of the wall 221, and the engaging groove 411 and the wall 221 may engage tightly with each other. Furthermore, two sidewalls forming the engaging groove 411 may be two elastic walls 4A. The hook-shaped structures 412 are between a side of one of the two elastic walls 4A and a side of another one of the two elastic walls 4A facing each other, and each of the hook-shaped structures 412 may include a guiding inclined surface 4121. During the engagement process between the engaging groove 411 of the first snap-fit component 4 and the wall 221, the wall 221 abuts against the guiding inclined surface 4121, so that the two elastic walls 4A are slightly elastically deformed outwards and the hook-shaped structures 412 can smoothly enter the perforations 222.

Referring to FIG. 3, FIG. 6, and FIG. 8, in the assembly process of the assembled door AX of the present disclosure, the operator may first fix the first snap-fit components 4 on the first outer frame 2. Next, the first outer frame 2, which is already installed with the first snap-fit components 4, is installed on one side of the door panel 1. At this time, a portion of each of the first snap-fit components 4 correspondingly lies within the door opening 1A.

Referring to FIG. 7 and FIG. 8, a plurality of first interconnecting structures 42 of the first snap-fit component 4 are located on another one of the two sides of the first snap-fit component 4. Each of the first interconnecting structures 42 can interlock with one of a plurality of second interconnecting structures 52 of the second snap-fit component 5. It should be noted that the first interconnecting structures 42 and the second interconnecting structures 52 are primarily configured to connect the second snap-fit component 5 with the first snap-fit component 4. Therefore, specific shapes of the first interconnecting structures 42 and the second interconnecting structures 52 are not limited herein.

Figure 9:
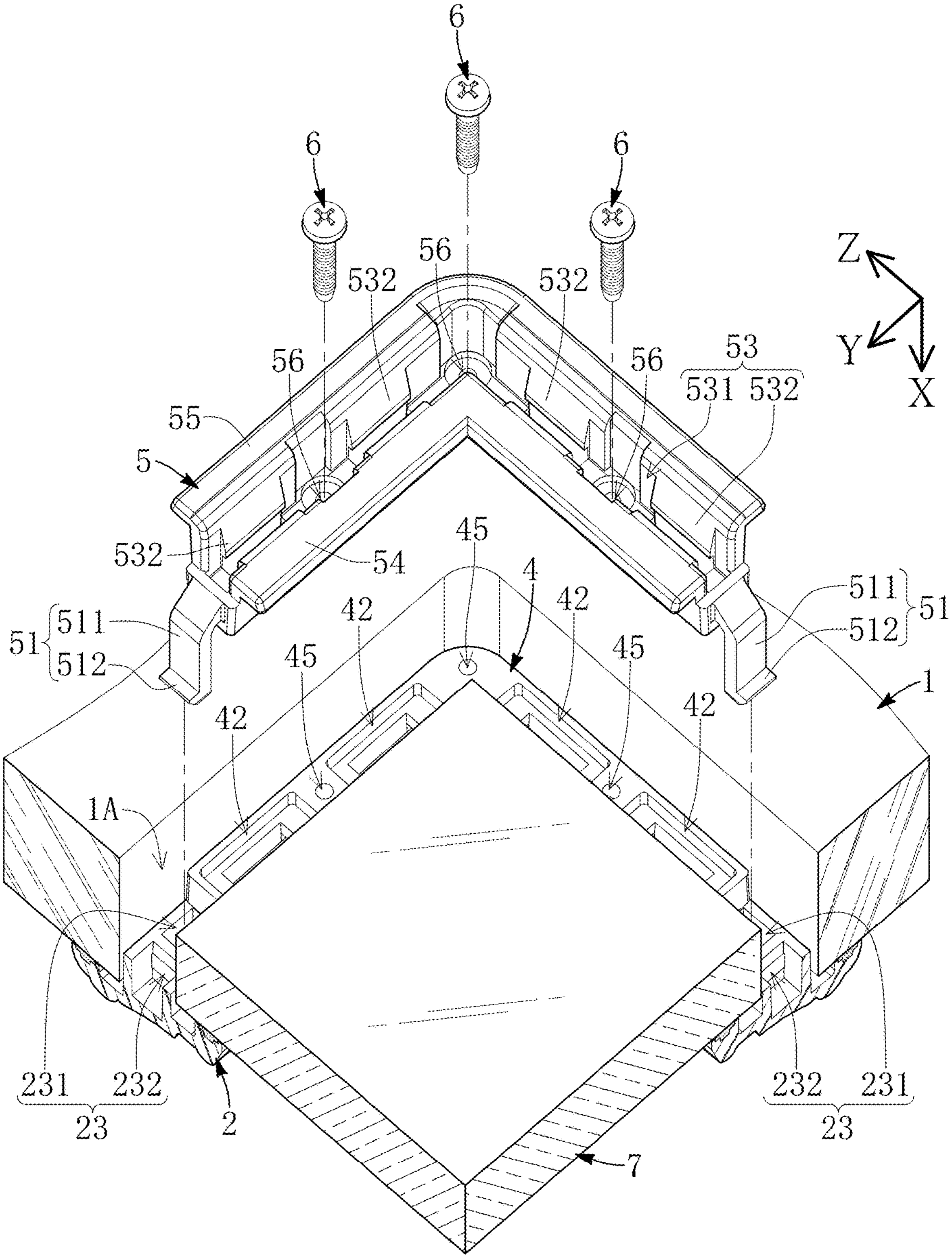
FIG. 9 is a schematic exploded and cross-sectional view of a second snap-fit component of the assembled door and the first outer frame and the first snap-fit component that are installed on a door panel according to one of the embodiments of the present disclosure.
Figure 10:
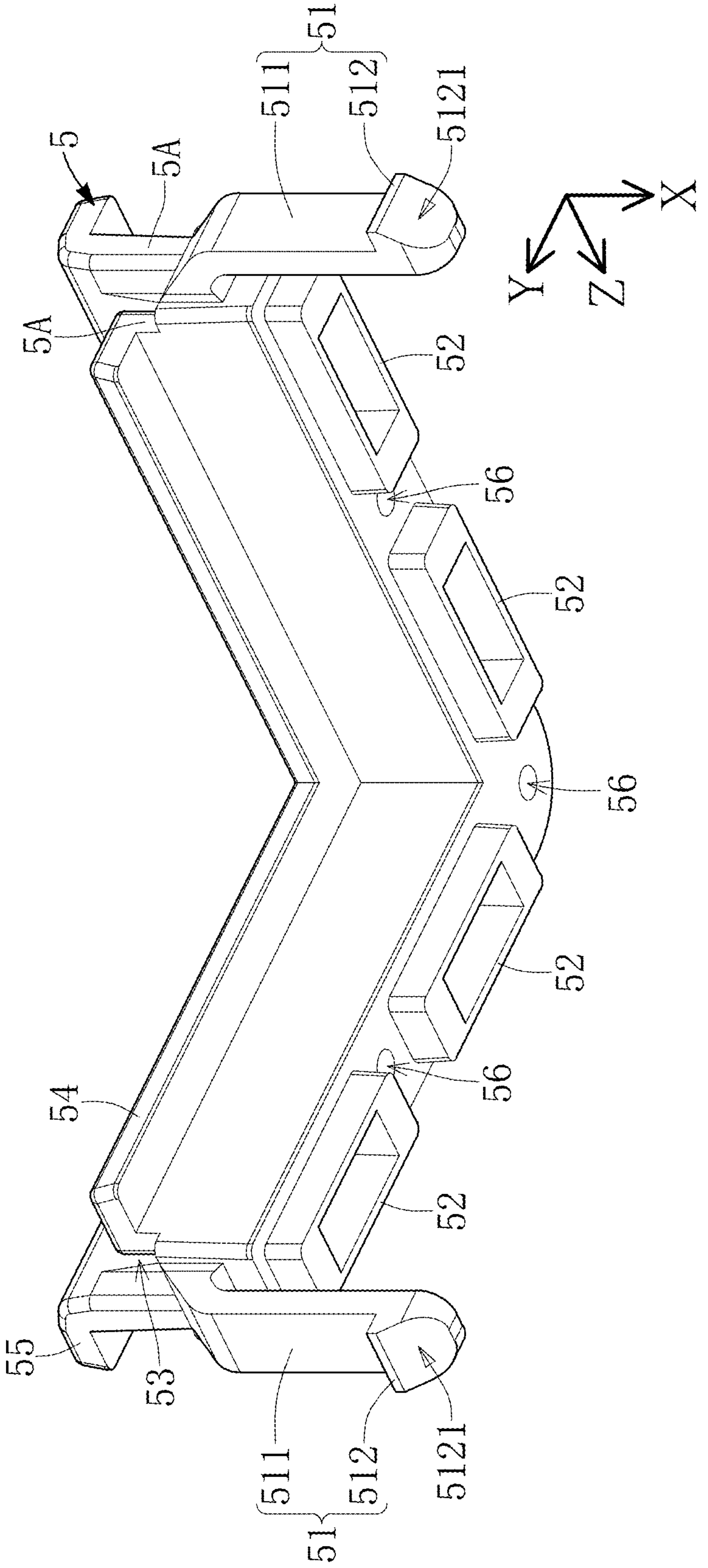
FIG. 10 is a schematic view of the second snap-fit component of the assembled door according to one of the embodiments of the present disclosure.
Figure 11:
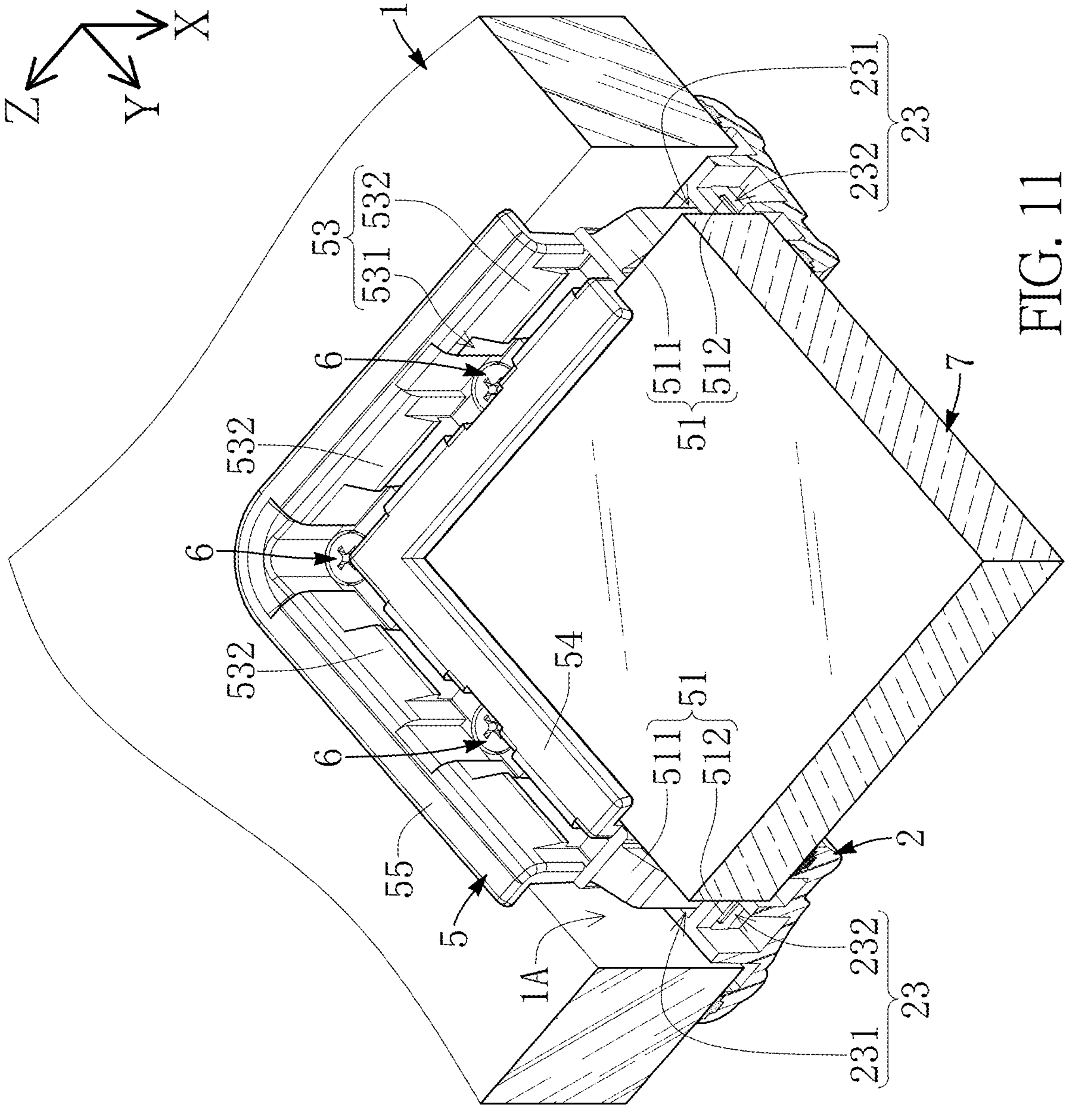
FIG. 11 and FIG. 12 are schematic cross-sectional views of different positions where the first snap-fit component, the first outer frame, and the second snap-fit component of the assembled door are installed on the door panel according to one of the embodiments of the present disclosure.
Figure 12:
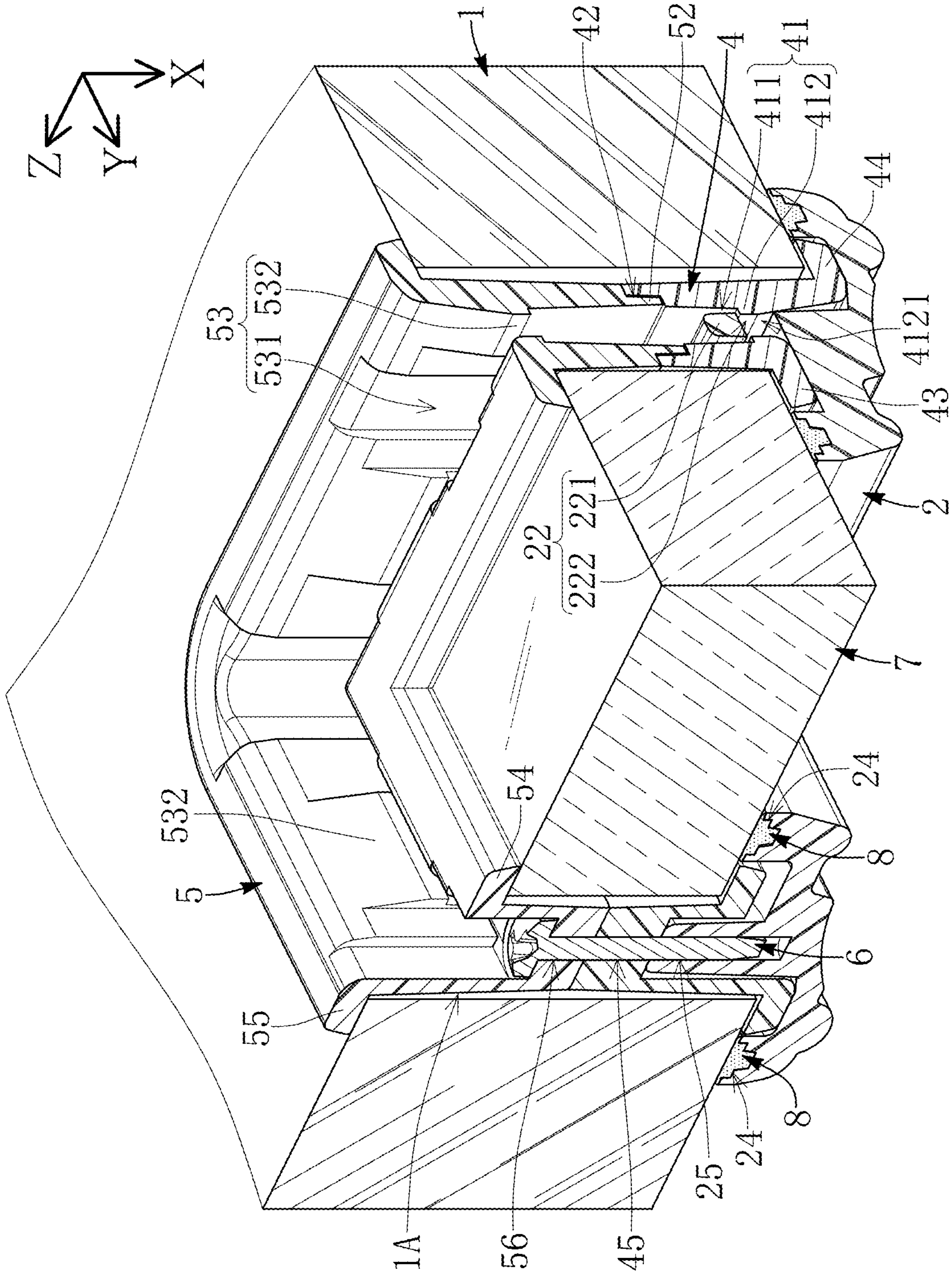

Referring to FIG. 9 to FIG. 12, FIG. 9 is a schematic exploded and cross-sectional view of a second snap-fit component of the assembled door and the first outer frame and the first snap-fit component that are installed on a door panel according to one of the embodiments of the present disclosure, FIG. 10 is a schematic view of the second snap-fit component of the assembled door according to one of the embodiments of the present disclosure, and FIG. 11 and FIG. 12 are schematic cross-sectional views of different positions where the first snap-fit component, the first outer frame, and the second snap-fit component of the assembled door are installed on the door panel according to one of the embodiments of the present disclosure.

In other embodiments of the present disclosure, each of the first interconnecting structures 42 of the first snap-fit component 4 may be a rectangular recess, and each of the second interconnecting structures 52 of the second snap-fit component 5 may correspondingly be a rectangular protruding structure. Naturally, in another one embodiments of the present disclosure, each of the first interconnecting structures 42 may be a protruding structure, and each of the second interconnecting structures 52 may be a recess.

Each of the second snap-fit components 5 includes a plurality of second engaging structures 51, at least one second interconnecting structure 52, and at least one third engaging structure 53. Quantities of the second engaging structures 51, the at least one second interconnecting structure 52, and the at least one third engaging structure 53 included in the second snap-fit component 5 are not limited to those shown in the figures and may be varied according to actual requirements.

The second engaging structures 51 are respectively connected to the second outer frame engaging structures 23 of the first outer frame 2. For example, two second engaging structures 51 of the second snap-fit component 5 may be located at two ends of the second snap-fit component 5. Each of the two second engaging structures 51 may include a resilient arm 511 and a hook-shaped structure 512 that is located at a free end of the resilient arm 511. The second outer frame engaging structure 23 may include a receiving groove 231 and a perforation 232, and the receiving groove 231 is configured to accommodate the free end of the resilient arm 511.

During the engagement process between the second snap-fit component 5 and the second outer frame engaging structure 23, each of the resilient arms 511 enters the receiving groove 231 and is elastically deformed as a sidewall on which the receiving groove 231 is formed pushes against the resilient arm 511. When the second outer frame engaging structure 23 of the second snap-fit component 5 interlocks with the second outer frame engaging structure 23 of the first outer frame 2, the resilient arm 511 is positioned within the receiving groove 231, and a portion of the hook-shaped structure 512 is positioned within the perforation 232. When the second snap-fit component 5 is slightly pulled away from the first outer frame 2 while engaged with the second outer frame engaging structure 23, the second snap-fit component 5 will not easily disengage from the first outer frame 2 due to the hook-shaped structure 512 abutting against the sidewall forming the perforation 232.

By virtue of "the second engaging structure 51 including the resilient arm 511 and the hook-shaped structure 512" and "the second outer frame engaging structure 23 including the receiving groove 231 and the perforation 232," a user installing the second snap-fit component 5 only needs to insert the resilient arms 511 into two corresponding ones of the receiving grooves 231, thereby enabling the second snap-fit component 5 to quickly and conveniently interlock with the second outer frame engaging structure 23 of the first outer frame 2 through the second engaging structures 51.

By virtue of the second engaging structure 51 and the second outer frame engaging structure 23, a connection strength among the second snap-fit component 5, the first snap-fit component 4, and the first outer frame 2 can be enhanced, making separation among these three components difficult.

Figure 14:
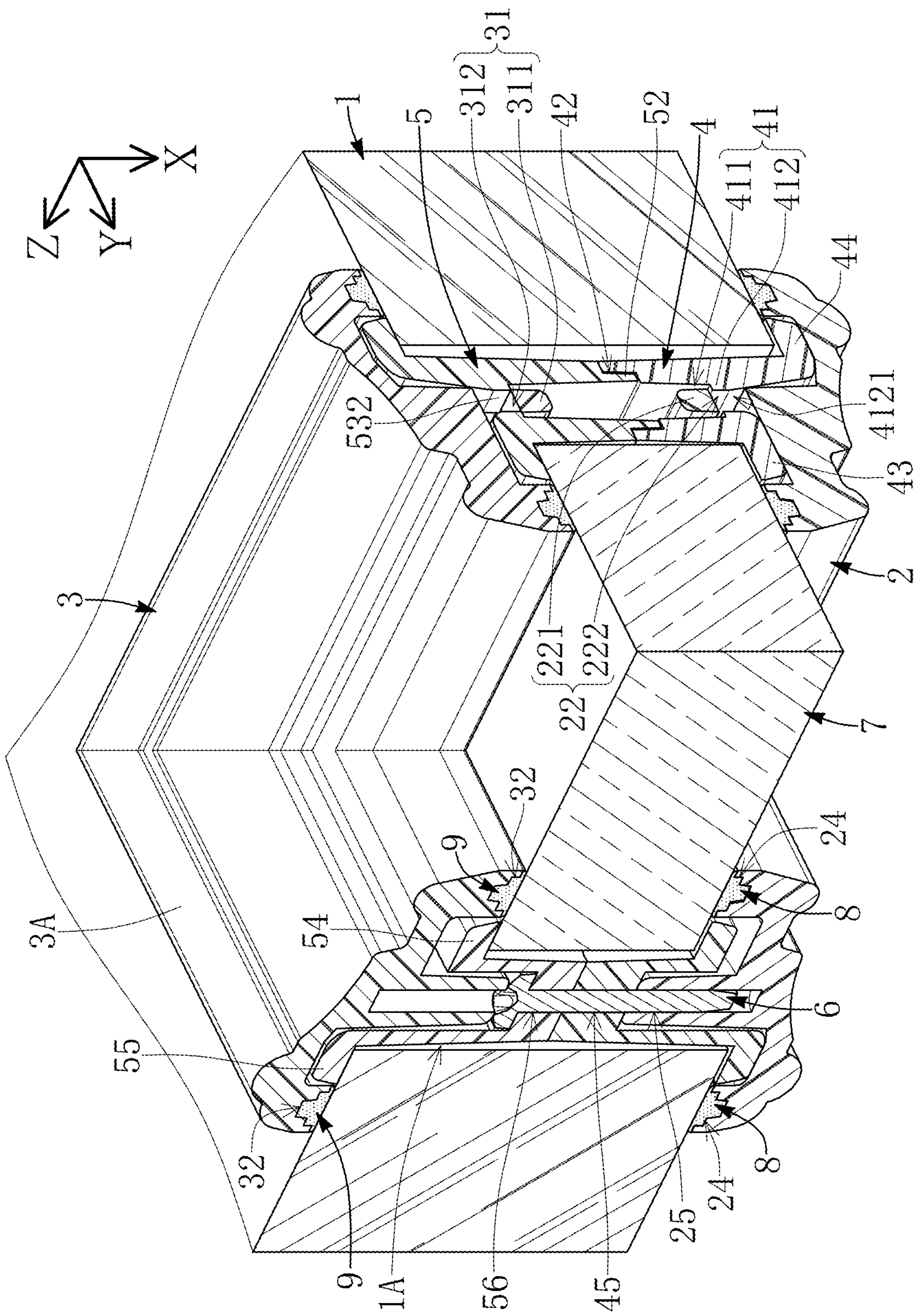
FIG. 14 is a schematic cross-sectional view of a part of the assembled door according to one of the embodiments of the present disclosure.

Referring to FIG. 11 to FIG. 14, FIG. 13 is a schematic exploded and cross-sectional view of the second outer frame of the assembled door, and the first outer frame, the first snap-fit component and the second snap-fit component that are installed on the first outer frame of the door panel according to one of the embodiments of the present disclosure, and FIG. 14 is a schematic cross-sectional view of a part of the assembled door according to one of the embodiments of the present disclosure.

The third engaging structure 53 is located on another one of the two sides of the second snap-fit component 5. The second snap-fit component 5 is fixed on the second outer frame 3 through the third engaging structure 53 engaging with the third outer frame engaging structure 31 of the second outer frame 3. The third engaging structure 53 may include an engaging groove 531 and a plurality of hook-shaped structures 532. The second outer frame engaging structure 23 of the second outer frame 3 may include a wall 233 and a plurality of perforations 234, and each of the perforations 234 penetrates through the wall 233.

When the third engaging structure 53 engages with the second outer frame engaging structure 23, the engaging groove 531 interlocks with the wall 233, and a portion of the hook-shaped structures 532 is positioned within the perforations 234. In practical applications, a width of the engaging groove 531 may be slightly less than a thickness of the wall 233, so that the engaging groove 531 and the wall 233 can engage tightly with each other. Furthermore, two sidewalls forming the engaging groove 531 may be elastic walls 5A. Two hook-shaped structures 532 is formed on two sides of the two elastic walls 5A facing each other, and each of the two hook-shaped structures 532 may include a guiding inclined surface 5321. During the engagement process between the engaging groove 531 of the third engaging structure 53 and the wall 233, the wall 233 abuts against the guiding inclined surface 5321, so that the two elastic walls 5A can elastically deform outwardly, thereby allowing the hook-shaped structure 532 to smoothly enter the perforation 234.

In other embodiments of the present disclosure where the first outer frame 2 and the second outer frame 3 are identical components, the first outer frame engaging structure 22 of the first outer frame 2 and the second outer frame engaging structure 23 of the second outer frame 3 have the same structure, and the first engaging structure 41 and the third engaging structure 53 have the same structure.

Referring to FIG. 6, FIG. 9, FIG. 13, and FIG. 14, each of the first snap-fit components 4 may further include at least one first inner limiting structure 43, and each of the second snap-fit components 5 may further include at least one second inner limiting structure 54. Each of the first inner limiting structures 43 and each of the second inner limiting structures 54 are all located within the door opening 1A. Each of the first inner limiting structure 43 abuts against one of two side surfaces of the decorative component 7, and each of the second inner limiting structures 54 abuts against another one of the two side surfaces of the decorative component 7. The first inner limiting structures 43 and the second inner limiting structures 54 jointly clamp the decorative component 7. By virtue of the first inner limiting structures 43 and the second inner limiting structures 54, when the first snap-fit component 4 and the second snap-fit component 5 interlock, the first snap-fit component 4 and the second snap-fit component 5 jointly clamp the decorative component 7, so that the decorative component 7 is firmly disposed on the door pane 11.

Each of the first snap-fit components 4 further includes at least one first outer limiting structure 44, and each of the second snap-fit components 5 further includes at least one second outer limiting structure 55. Each of the first outer limiting structures 44 abuts against one of two sides of the door panel 1, and each of the second outer limiting structures 55 abuts against another one of the two sides of the door panel 1. The first outer limiting structures 44 and the second outer limiting structures 55 jointly clamp the door panel 1. By virtue of the first outer limiting structures 44 and the second outer limiting structures 55, when the first snap-fit component 4 and the second snap-fit component 5 interlock, the first outer limiting structures 44 and the second outer limiting structures 55 jointly clamp the door panel 1, so that the first snap-fit component 4 and the second snap-fit component 5 are firmly disposed on the door pane 11.

Referring to FIG. 6, FIG. 8, FIG. 9, and FIG. 10, in the assembly process of the assembled door AX of the present disclosure, after the operator fixes the first outer frame 2 equipped with the first snap-fit component 4 to one of the two sides of the door panel 1, the operator can first install the decorative component 7 into the door opening 1A. At this time, the decorative component 7 is supported by the first outer frame 2 and the first snap-fit components 4. Subsequently, the operator can engage the second snap-fit components 5 with the first snap-fit components 4. In this way, the first snap-fit components 4 and the second snap-fit components 5 engaged with each other jointly hold the decorative component 7. At this stage, the decorative component 7 is essentially fixed on the door panel 1 by the first snap-fit components 4 and the second snap-fit components 5, and the door panel 1 can essentially be placed upright.

In an example where the decorative component 7 is glass, during the assembly process of the assembled door A, the decorative component 7 can be fixed in the door opening 1A by interlocking the first snap-fit components 4 with the second snap-fit components 5. During subsequent assembly steps, the decorative component 7 will not easily detach from the door panel 1. In conventional assembled doors with glass, detachment of the glass from the door panel during assembly is a common problem. The assembled door AX of the present disclosure effectively addresses this issue through the design of the first outer frame 2, the first snap-fit components 4, and the second snap-fit components 5, so as to prevent the glass from easily detaching from the door panel during assembly. In other embodiments of the present disclosure, in order to better fix the decorative component 7 to the door panel 1, the first snap-fit components 4 and the second snap-fit components 5 may be made of engineering plastic.

Referring to FIG. 9, FIG. 11, and FIG. 14, the assembled door AX may further include a plurality of locking components 6. The first outer frame 2 has at least one first outer frame locking hole 25, each of the first snap-fit components 4 has at least one first locking hole 45, and each of the second snap-fit components 5 has at least one second locking hole 56. Each of the locking components 6 is locked into the first outer frame locking hole 25, the first locking hole 45, and second locking hole 56 that are interconnected to each other. When the first snap-fit component 4 is fixed on the first outer frame 2, the first locking hole 45 are in spatial communication with the first outer frame locking hole 25. When the second snap-fit component 5 interlocks with the first snap-fit component 4, the second locking hole 56, the first locking hole 45, and the first outer frame locking hole 25 are in spatial communication with each other. Thus, an operator can lock the locking components 6 into the first locking hole 45, the second locking hole 56, and the first outer frame locking hole 25 that are interconnected to each other, so that the first snap-fit component 4, the second snap-fit component 5, and the first outer frame 2 are more firmly connected to each other.

Referring to FIG. 9 and FIG. 12, in the actual assembly process of the assembled door AX of the present disclosure, after the second snap-fit components 5 interlock with the first snap-fit components 4, the locking components 6 can then be installed on the first snap-fit components 4 and second snap-fit components 5 that are interlocked to each other. Each of the locking components 6 locks with the first locking hole 45 of the first snap-fit component 4, the second locking hole 56 of the second snap-fit component 5, and the first outer frame locking hole 25. A connection strength among the first snap-fit component 4, the second snap-fit component 5, and the first outer frame 2 is strengthened by a setting of the locking components 6. Accordingly, a connection strength between the decorative component 7 and the door panel 1 can be further strengthened, so as to prevent the decorative component 7 from detaching from the door panel 1.

It should be emphasized that during the process in which an operator locks the locking components 6 to the first snap-fit components 4 and the second snap-fit components 5 that are interlocked to each other, the decorative component 7 is already held firmly by the first snap-fit components 4 and the second snap-fit components 5 that are interlocked to each other. Therefore, the operator generally does not need to worry about the decorative component 7 (particularly when the decorative component 7 is made of glass) detaching from the door panel 1 during the locking process of the locking components 6.

Additionally, during the aforementioned assembly process, when the first snap-fit component 4, the second snap-fit component 5, and the first outer frame 2 are fixed to each other through the locking components 6, the first inner limiting structures 43 and the second inner limiting structures 54 can better clamp the decorative component 7 through the locking components 6. At the same time, the locking components 6 allow the first outer limiting structures 44 and the second outer limiting structures 55 to better clamp the door panel 1.

Referring to FIG. 12 to FIG. 14, in the assembly process of the assembled door AX of the present disclosure, after the operator fixes the first snap-fit components 4 and the second snap-fit components 5 interlocked to each other to the first outer frame 2 by using the locking components 6, the operator may first install the two second annular sealing members 9 onto the second outer frame 3. Then, the operator directly installs the second outer frame 3 on another one of the two sides of the door panel 1. During the installation, the operator only needs to make the second outer frame engaging structures 23 of the second outer frame 3 interlock with the plurality of third engaging structures 53 of the second snap-fit components 5. In this way, the installation of the second outer frame 3 can be completed.

It is worth mentioning that, by virtue of the first outer frame 2, the first snap-fit components 4, the second snap-fit components 5, and the locking components 6, operators can replace the decorative component 7 of the assembled door AX without removing hinges of the assembled door AX Specifically, operators may first remove the second outer frame 3, then remove the plurality of locking components 6. Since the first snap-fit components 4 and the second snap-fit components 5 interlock with each other, even after removing the locking components 6, the decorative component 7 can still be securely held within the door opening 1A. Subsequently, operators can support the decorative component 7 and remove the first snap-fit components 4 one by one, thereby detaching the decorative component 7 from the door opening 1A.

As described above, the assembled door AX of the present disclosure, by virtue of the first outer frame 2, the second outer frame 3, the first snap-fit components 4, the second snap-fit components 5, and the locking components 6, the operator can complete the installation of the assembled door AX quickly and easily.

Additionally, by virtue of the first outer frame engaging structure 22 and the second outer frame engaging structure 23 of the first outer frame 2, the first engaging structure 41 and the first interconnecting structure 42 of the first snap-fit component 4, the second engaging structure 51, the second interconnecting structure 52, and the third engaging structure 53 of the second snap-fit component 5, and the third outer frame engaging structure 31 of the second outer frame 3, the first outer frame 2 and the second outer frame 3 of the assembled door AX are not easily detachable, thereby enhancing the anti-theft effect of the assembled door AX. Furthermore, in cooperation with the locking components 6, the assembled door AX can further strengthen the connection strength among the first outer frame 2, the first snap-fit components 4, and the second snap-fit components 5, thereby further improving the anti-theft effect.

Figure 15:
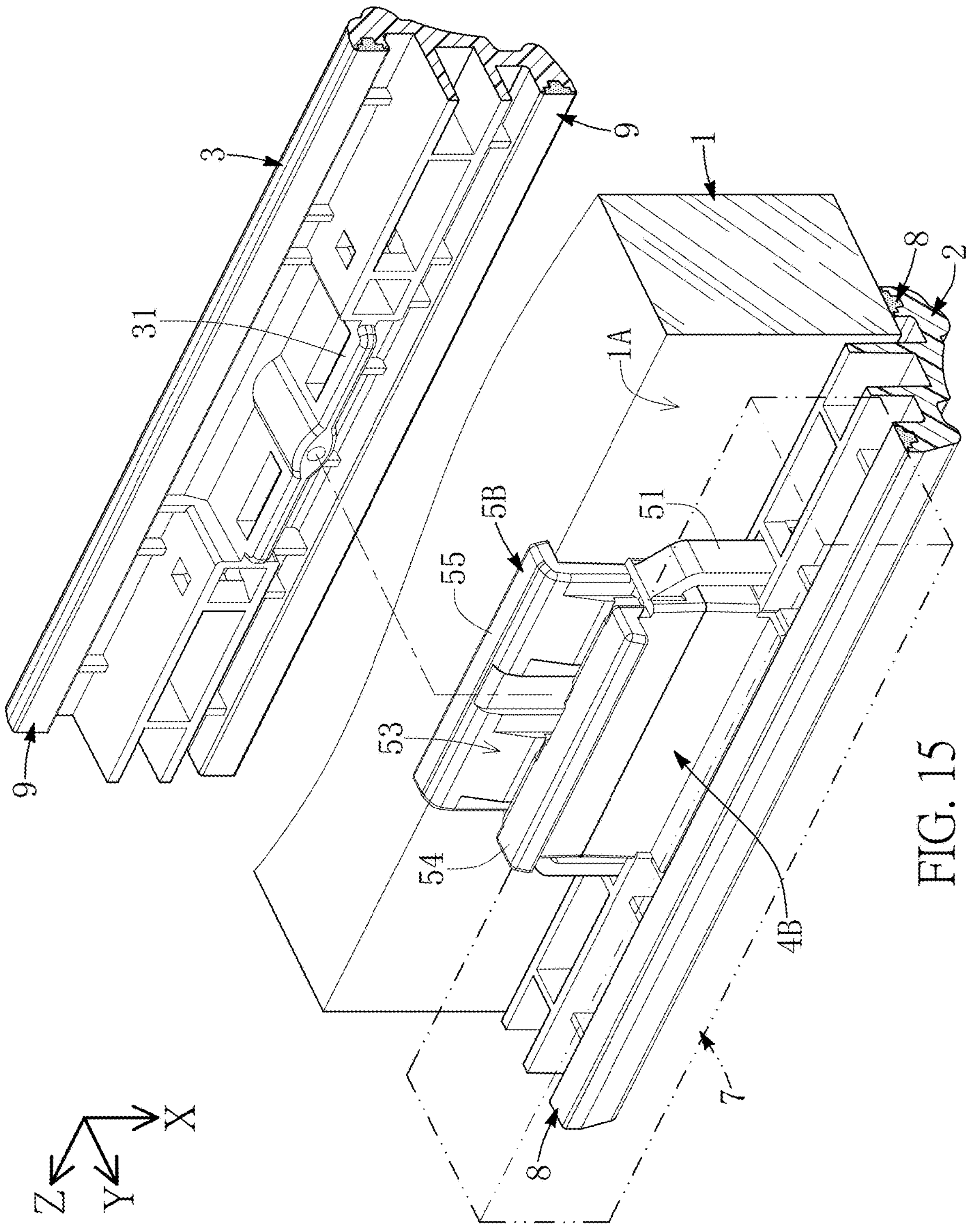
FIG. 15 is a schematic partial cross-sectional view of the second outer frame at different positions, and the first outer frame, the first snap-fit component and the second snap-fit component installed on the door panel of the assembled door according to one of the embodiments of the present disclosure.
Figure 16:
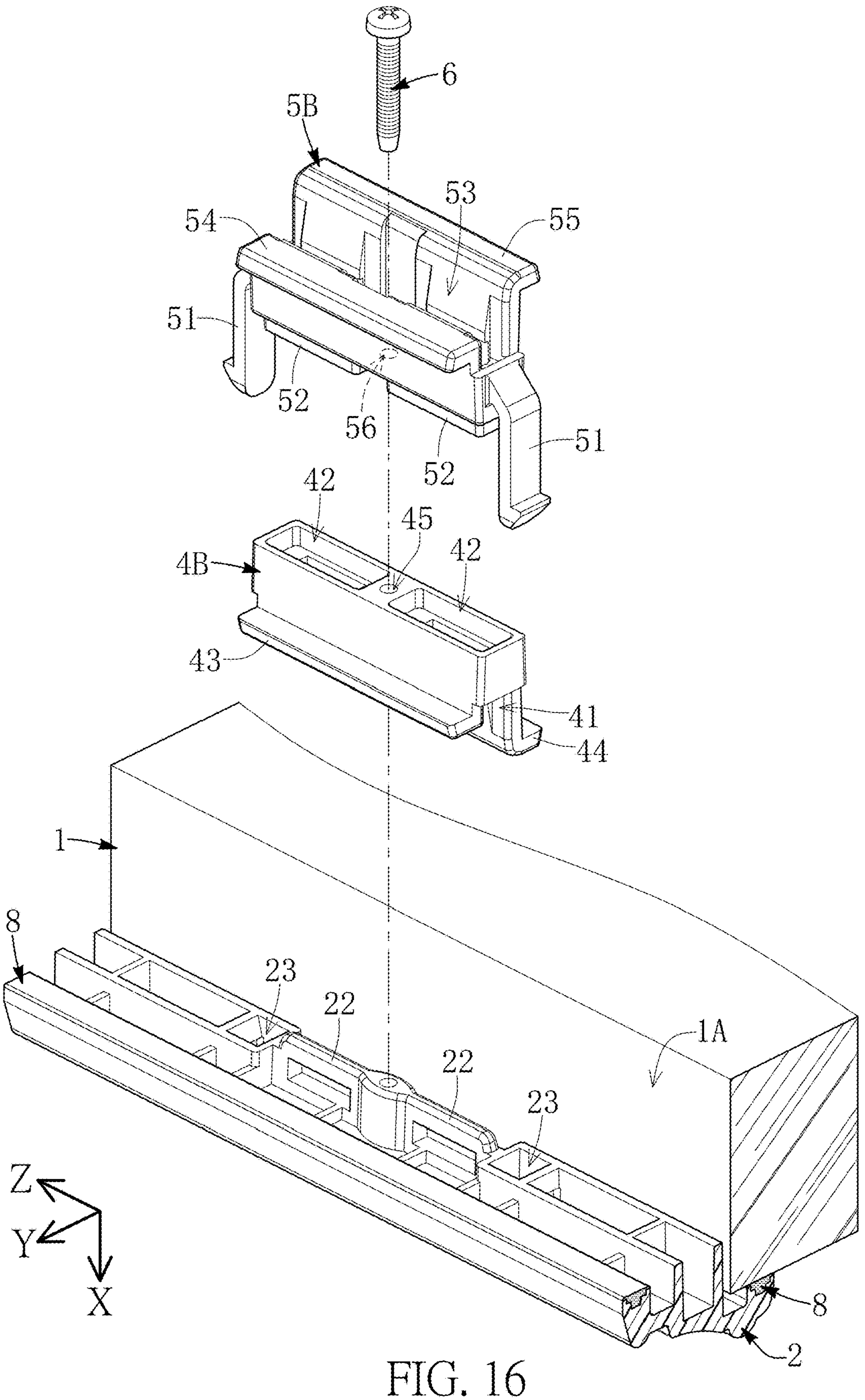
FIG. 16 is a schematic exploded and cross-sectional view of the first snap-fit component and the second snap-fit component at different positions, and the first outer frame installed on the door panel of the assembled door according to one of the embodiments of the present disclosure.

Referring to FIG. 15 and FIG. 16, FIG. 15 is a schematic partial cross-sectional view of the second outer frame at different positions, and the first outer frame, the first snap-fit component and the second snap-fit component installed on the door panel of the assembled door according to one of the embodiments of the present disclosure, and FIG. 16 is a schematic exploded and cross-sectional view of the first snap-fit component and the second snap-fit component at different positions, and the first outer frame installed on the door panel of the assembled door according to one of the embodiments of the present disclosure.

Referring to FIG. 3, FIG. 6, and FIG. 9, in the above description, the first snap-fit components 4 and the second snap-fit components 5 located at the four corners of the assembled door AX are described. In FIG. 15 and FIG. 16, the first snap-fit component 4B and the second snap-fit component 5B disposed along the long sides of the first outer frame 2 are illustrated.

Referring to FIG. 6, and FIG. 7, the first snap-fit component 4 located at the corner positions of the assembled door AX generally has an L-shaped overall configuration. The first engaging structure 41 of the first snap-fit component 4 also generally has an L-shaped overall configuration, and the first inner limiting structure 43 and the first outer limiting structure 44 generally have L-shaped overall configurations. The first snap-fit component 4 includes four first interconnecting structures 42 and three first locking holes 45. Two first outer frame engaging structures 22 of the first outer frame 2 also generally have L-shaped overall configurations.

Referring to FIG. 16, the first snap-fit component 4B located at a position of the long side of the first outer frame 2 generally has an I-shaped overall configuration, and the first engaging structure 41 of the first snap-fit component 4B generally has an I-shaped overall configuration. The first inner limiting structure 43 and the first outer limiting structure 44 generally have I-shaped overall configurations, and the first snap-fit component 4B includes two of the four first interconnecting structures 42 and one of the three first locking holes 45. The first outer frame engaging structure 22 located at a position of the long side of the first outer frame 2 generally has an I-shaped overall configuration.

Referring to FIG. 3, FIG. 9, and FIG. 10, the second snap-fit component 5 located at the corner positions of the assembled door AX generally has an L-shaped overall configuration, and the third engaging structure 53 of the second snap-fit component 5 generally has an L-shaped overall configuration. The second inner limiting structure 54 and the second outer limiting structure 55 generally have L-shaped overall configurations, and the second snap-fit component 5 includes four second interconnecting structures 52 and three second locking holes 56. The second outer frame engaging structure 23 of the second outer frame 3 generally has an L-shaped overall configuration.

Referring to FIG. 15 and FIG. 16, the second snap-fit component 5B located at a position of the long side of the first outer frame 2 generally has an I-shaped overall configuration, and the third engaging structure 53 of the second snap-fit component 5B generally has an I-shaped overall configuration. The second inner limiting structure 54 and the second outer limiting structure 55 generally have I-shaped overall configurations, and the second snap-fit component 5B includes two of the four second interconnecting structures 52 and one of the three second locking holes 56. The second outer frame engaging structure 23 located at a position of the long side of the second outer frame 3 generally has an I-shaped overall configuration.

As described above, in practical applications, the overall configurations of the first snap-fit components 4 and 4B, the quantities and configurations of the respective structures included in the first snap-fit components 4 and 4B, the overall configurations of the second snap-fit components 5 and 5B, and the quantities and configurations of the respective structures included in the second snap-fit components 5 and 5B may be varied according to actual requirements (such as the positions where the first snap-fit components 4 and 4B are disposed on the assembled door A, and the positions where the second snap-fit components 5 and 5B are disposed on the assembled door A).

Additionally, it should be noted that the overall configurations of the first snap-fit components 4, 4B and the second snap-fit components 5, 5B are basically adapted to the shape of the door opening 1A and the positions of the first snap-fit components 4, 4B and the second snap-fit components 5, 5B disposed on the door opening 1A. That is, in other embodiments of the present disclosure where the door opening 1A is circular or elliptical, the overall configurations of the first snap-fit components 4, 4B and second snap-fit components 5, 5B will be arcuate.

Figure 17:
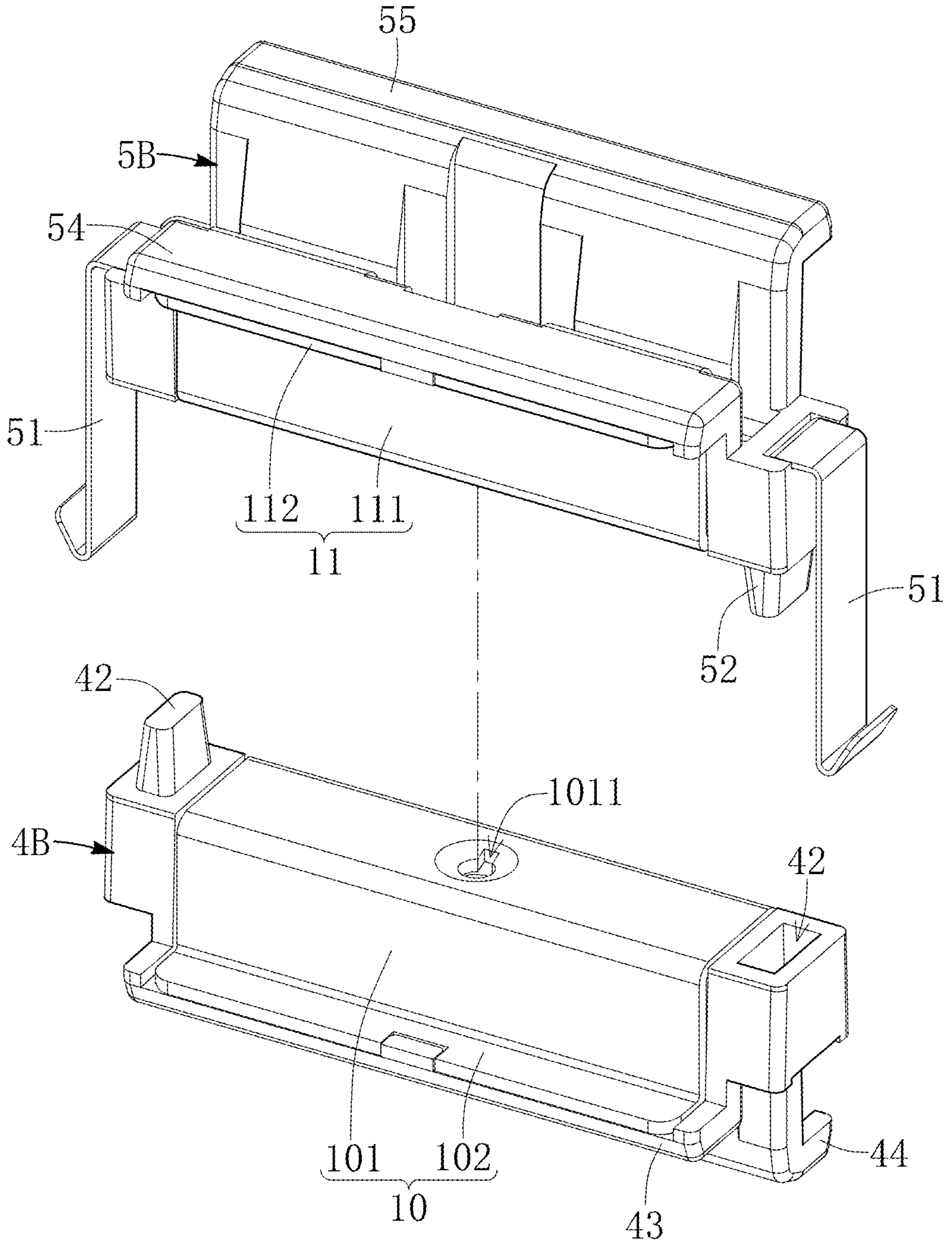
FIG. 17 and FIG. 18 are schematic exploded views of the first snap-fit component and the second snap-fit component of the assembled door from different perspectives according to another one of the embodiments of the present disclosure.
Figure 18:
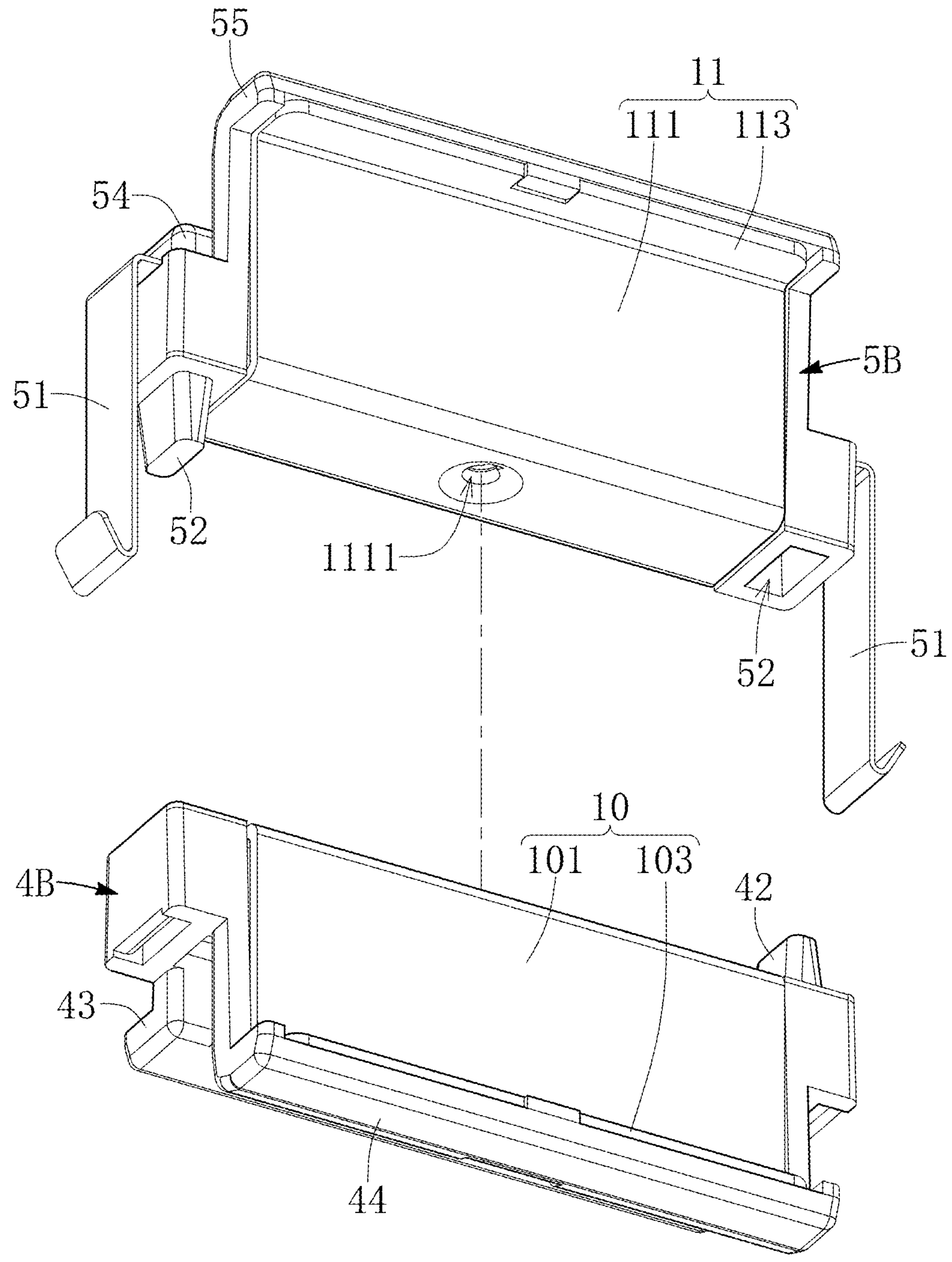
Figure 19:
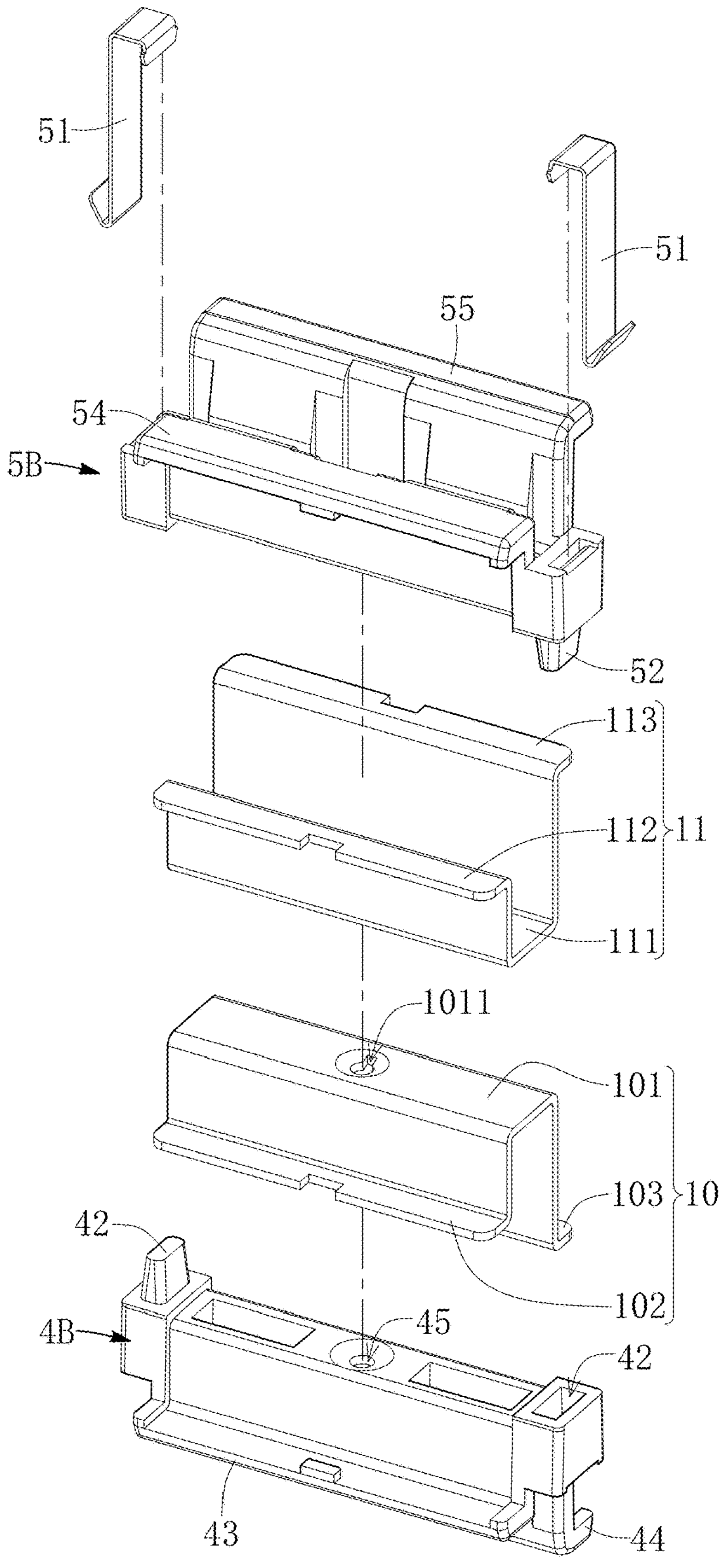
FIG. 19 is schematic exploded view of the first snap-fit component, a first metal reinforcement member, the second snap-fit component, and a second metal reinforcement member of the assembled door according to another one of the embodiments of the present disclosure.

Referring to FIG. 17 to FIG. 19, FIG. 17 and FIG. 18 are schematic exploded views of the first snap-fit component and the second snap-fit component of the assembled door from different perspectives according to another one of the embodiments of the present disclosure, and FIG. 19 is a schematic exploded view of the first snap-fit component, a first metal reinforcement member, the second snap-fit component, and a second metal reinforcement member of the assembled door according to another one of the embodiments of the present disclosure.

The difference between the present embodiment and the first embodiment mainly resides in that the first snap-fit component 4 is further provided with a first metal reinforcement member 10. In specific applications, the first snap-fit component 4 may be made of plastic, and the first metal reinforcement member 10 may be fixed on the first snap-fit component 4 by means such as snapping or bonding. Naturally, in another one of the embodiments of the present disclosure, the first snap-fit component 4 and the first metal reinforcement member 10 may be integrally formed by methods such as two-shot injection molding or insert molding.

The first metal reinforcement member 10 includes a first connecting structure 101, a first inner reinforcement structure 102, and a first outer reinforcement structure 103. A side surface of the first connecting structure 101 may have a generally U-shaped configuration. The first connecting structure 101 may also have a hole 1011 that may be a through perforation or a locking hole. The first inner reinforcement structure 102 is connected to the first outer reinforcement structure 103 via the first connecting structure 101.

The first connecting structure 101 is fixed on the first snap-fit component 4, the first inner reinforcement structure 102 abuts against the first inner limiting structure 43, and the first outer reinforcement structure 103 abuts against the first outer limiting structure 44. The hole 1011 of the first connecting structure 101 is in spatial communication with the first locking hole 45. The strength of the overall structure of the first snap-fit component 4 installed with the first metal reinforcement member 10 can be further improved.

The second snap-fit component 5 of the present embodiment is further provided with a second metal reinforcement member 11. The second metal reinforcement member 11 includes a second connecting structure 111, a second inner reinforcement structure 112, and a second outer reinforcement structure 113. A side surface of the second connecting structure 111 may have a generally U-shaped configuration. The second connecting structure 111 may also include a hole 1111, which may be a through perforation or a locking hole. The second inner reinforcement structure 112 is connected to the second outer reinforcement structure 113 via the second connecting structure 111.

The second connecting structure 111 is fixed on the second snap-fit component 5, the second inner reinforcement structure 112 abuts against the second inner limiting structure 54, and the second outer reinforcement structure 113 abuts against the second outer limiting structure 55. The hole 1111 of the second connecting structure 111 is in spatial communication with the first locking hole 45. The strength of the overall structure of the second snap-fit component 5 installed with the second metal reinforcement member 11 can be further improved.

The difference between the present embodiment and the first embodiment mainly resides in that the second engaging structure 51 of the second snap-fit component 5 is made of metal and is an independent metal member. Naturally, in another one of the embodiments of the present disclosure, the second engaging structure 51 made of metal may be integrally formed with the remaining non-metallic parts of the second snap-fit component 5 by methods such as two-shot injection molding or insert molding.

After the first metal reinforcement member 10 is installed on the first snap-fit component 4, the first inner reinforcement structure 102 corresponds to one side of the first inner limiting structure 43. After the second metal reinforcement member 11 is installed on the second snap-fit component 5, the second inner reinforcement structure 112 corresponds to one side of the second inner limiting structure 54. Therefore, when the first snap-fit component 4 and the second snap-fit component 5 interlock, the first inner reinforcement structure 102 and the second inner reinforcement structure 112 jointly clamp the decorative component 7.

Similarly, after the first metal reinforcement member 10 is installed on the first snap-fit component 4, the first outer reinforcement structure 103 corresponds to one side of the first outer limiting structure 44.

After the second metal reinforcement member 11 is installed on the second snap-fit component 5, the second outer reinforcement structure 113 corresponds to one side of the second outer limiting structure 55. Therefore, when the first snap-fit component 4 and the second snap-fit component 5 interlock, the first outer reinforcement structure 103 and the second outer reinforcement structure 113 jointly clamp the door panel 1.

It is worth mentioning that the assembled door AX of the present embodiment can be applied as a fire door or a high-temperature resistant door. In this application, the materials of the door panel 1, the first outer frame 2, the first snap-fit component 4, the second snap-fit component 5, and the second outer frame 3 may be selected from high-temperature resistant plastics or fire-retardant plastics. When the assembled door AX of the present embodiment is used as a fire door, the inclusion of the first metal reinforcement members 10 and the second metal reinforcement members 11 can effectively extend the time during which the decorative component 7 remains fixed on the door panel 1. More specifically, because the melting point of metal is higher than the melting point of plastic materials, and the first metal reinforcement members 10 and the second metal reinforcement members 11 jointly hold the decorative component 7, the first metal reinforcement members 10 and the second metal reinforcement members 11 are not easily melted in high-temperature environments such as fire scenes.

It should be noted that, in the aforementioned embodiment where the assembled door AX is applied as a fire door, in addition to the door panel 1, the first outer frame 2, and the second outer frame 3 being made of fire-resistant or high-temperature-resistant materials, each of the first snap-fit components 4 and each of the second snap-fit components 5 may also be made directly from metal materials.

In conclusion, in the assembled door provided by the present disclosure, by virtue of the first outer frame, the first snap-fit component, the second snap-fit component, and the second outer frame, the assembled door can enable operators to quickly and easily complete the installation of the decorative component of the assembled door. Moreover, in the assembled door provided by the present disclosure, by virtue of "a decorative component being jointly fixed on the door panel by the first outer frame, the second outer frame, the first snap-fit components, and the second snap-fit components," the assembled door can allow operators to directly replace the decorative component without removing the hinges, even when the assembled door is already installed in the building.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An assembled door, comprising:

a door panel having a door opening, wherein the door opening penetrates through the door panel;

a first outer frame fixedly disposed on one of two sides of the door panel, wherein the first outer frame is configured to partially cover a part of the door opening, and wherein the first outer frame includes a plurality of first outer frame engaging structures and a plurality of second outer frame engaging structures;

a second outer frame fixedly disposed on another one of the two sides of the door panel, wherein the second outer frame is configured to partially cover a part of the door opening, and wherein the second outer frame includes a plurality of third outer frame engaging structures;

a plurality of first snap-fit components, wherein each of the first snap-fit components includes:

at least one first engaging structure located on one of two sides of the first snap-fit component, wherein the first engaging structure interlocks with the first outer frame engaging structure, so that the first snap-fit component is fixed on the first outer frame; and at least one first interconnecting structure located on another one of the two sides of the first snap-fit component;

a plurality of second snap-fit components, wherein each of the second snap-fit components includes:

a plurality of second engaging structures respectively connected to the second outer frame engaging structures of the first outer frame, wherein each of the second snap-fit components is fixed on one side of the first outer frame through the second engaging structures;

at least one second interconnecting structure located on one of two sides of the second snap-fit component, wherein the second interconnecting structure interlocks with the first interconnecting structure, so that the second snap-fit component is fixed on one of the two sides of the first snap-fit component; and at least one third engaging structure located on another one of the two sides of the second snap-fit component, wherein the third engaging structure interlocks with the third outer frame engaging structure of the second outer frame, so that the second snap-fit component is fixed on the second outer frame; and a decorative component located in the door opening and jointly fixed on the door panel by the first outer frame, the second outer frame, the first snap-fit components, and the second snap-fit components;

wherein the first outer frame and the first snap-fit components fixed on the door panel are configured to jointly support the decorative component, and the second snap-fit components interlocking with the first snap-fit components are configured to jointly retain the decorative component by the first outer frame and the first snap-fit components.

2. The assembled door according to claim 1, wherein the first snap-fit components and the second snap-fit components are made of engineering plastic; wherein each of the second engaging structures includes a resilient arm and a hook-shaped structure, and each of the second outer frame engaging structures includes a receiving groove and a perforation; and wherein, when the second engaging structure engages with a corresponding one of the second outer frame engaging structures, the resilient arm corresponds in position to the receiving groove, and the hook-shaped structure corresponds in position to the perforation.

3. The assembled door according to claim 1, further comprising a plurality of locking components; wherein the first outer frame has at least one first outer frame locking hole, each of the first snap-fit components has at least one first locking hole, and each of the second snap-fit components has at least one second locking hole; and wherein each of the locking members is locked into the first outer frame locking hole, the first locking hole, and the second locking hole that are in spatial communication with each other.

4. The assembled door according to claim 1, wherein the first outer frame and the second outer frame are completely identical.

5. The assembled door according to claim 1, wherein each of the first snap-fit components further includes at least one first inner limiting structure and each of the second snap-fit components further includes at least one second inner limiting structure; wherein the at least one first inner limiting structure and the at least one second inner limiting structure are located within the door opening; wherein the at least one first inner limiting structure abuts against one of two sides of the decorative component, and the at least one second inner limiting structures abuts against another one of the two sides of the decorative component; and wherein the at least one first inner limiting structure and the at least one second inner limiting structure jointly clamp the decorative component.

6. The assembled door according to claim 5, wherein each of the first snap-fit components further includes at least one first outer limiting structure and each of the second snap-fit components further includes at least one second outer limiting structure; wherein the at least one first outer limiting structure abuts against one of two sides of the door panel, and the at least one second outer limiting structure abuts against another one of the two sides of the door panel; and wherein the at least one first outer limiting structure and the at least one second outer limiting structure jointly clamp the door panel.

7. The assembled door according to claim 6, further comprising a plurality of first metal reinforcement members and a plurality of second metal reinforcement members; wherein, at least one of the first snap-fit component is equipped with one of the first metal reinforcement members, and each of the first metal reinforcement members includes a first connecting structure, a first inner reinforcement structure, and a first outer reinforcement structure; wherein the first inner reinforcement structure is connected to the first outer reinforcement structure via the first connecting structure, and the first connecting structure is fixed on the first snap-fit component; wherein the first inner reinforcement structure abuts against the first inner limiting structure, and the first outer reinforcement structure abuts against the first outer limiting structure; wherein, at least one of the second snap-fit components is equipped with one of the second metal reinforcement members, and each of the second metal reinforcement members includes a second connecting structure, a second inner reinforcement structure, and a second outer reinforcement structure; wherein the second inner reinforcement structure is connected to the second outer reinforcement structure via the second connecting structure and the second connecting structure is fixed on the second snap-fit component; wherein the second inner reinforcement structure abuts against the second inner limiting structure, and the second outer reinforcement structure abuts against the second outer limiting structure; and wherein the first metal reinforcement members and the second metal reinforcement members jointly clamp the decorative component through a plurality of first inner reinforcement structures and a plurality of second inner reinforcement structures, and the first metal reinforcement members and the second metal reinforcement members jointly clamp the door panel through a plurality of first outer reinforcement structures and a plurality of second outer reinforcement structures.

8. The assembled door according to claim 7, wherein, at least one of the second engaging structures of the second snap-fit components is made of metal.

9. The assembled door according to claim 1, wherein the first outer frame further includes a first annular groove, and the second outer frame further includes a second annular groove; wherein the assembled door further includes a first annular sealing member fixed in the first annular groove and a second annular sealing member fixed in the second annular groove; wherein the first annular sealing member is fixed in the first annular groove, and the second annular sealing member is fixed in the second annular groove; wherein the first annular sealing member is arranged between the door panel and the first outer frame, and the door opening is surrounded by the first annular sealing member; and wherein the second annular sealing member is arranged between the door panel and the second outer frame, and the door opening is surrounded by the second annular sealing member.

10. The assembled door according to claim 1, wherein a width of the door opening is greater than a width of the decorative component, and a length of the door opening is greater than a length of the decorative component; wherein a part of the first snap-fit components and a part of the second snap-fit components are arranged in a gap between the door opening and the decorative component; and wherein the gap between the door opening and the decorative component is covered by the first outer frame and the second outer frame.

* * * * *